(12) United States Patent
Suzuki

(10) Patent No.: US 12,231,068 B2
(45) Date of Patent: Feb. 18, 2025

(54) CONTROL DEVICE FOR MULTI-PHASE ROTATING MACHINE

(71) Applicant: DENSO CORPORATION, Kariya (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 121 days.

(21) Appl. No.: 18/053,692

(22) Filed: Nov. 8, 2022

(65) Prior Publication Data

US 2023/0079985 A1 Mar. 16, 2023

Related U.S. Application Data

(63) Continuation of application No. PCT/JP2021/017571, filed on May 7, 2021.

(30) Foreign Application Priority Data

May 12, 2020 (JP) ................................. 2020-083955

(51) Int. Cl.
  *H02P 25/22* (2006.01)
  *B62D 5/04* (2006.01)
  *H02J 7/00* (2006.01)
  *H02P 21/22* (2016.01)
  *H02P 27/12* (2006.01)

(52) U.S. Cl.
  CPC ................ *H02P 25/22* (2013.01); *H02J 7/00* (2013.01); *H02P 21/22* (2016.02); *H02P 27/12* (2013.01); *B62D 5/04* (2013.01)

(58) Field of Classification Search
  CPC ......... B60L 2240/423; B60L 2240/443; B60L 50/60; B60L 53/22; H02P 25/22; H02P 21/22; H02P 27/12; H02J 7/00; H02J 7/14
  See application file for complete search history.

(56) References Cited

U.S. PATENT DOCUMENTS 6,630,804 B2 * 10/2003 Moriya .................... H02P 6/005
  318/440
7,891,451 B2 * 2/2011 Oyobe .................... B60K 6/445
  180/65.265

(Continued)

FOREIGN PATENT DOCUMENTS

CN 112389236 A * 2/2021 ............. B60L 53/00
JP 2019-213400 A 12/2019

OTHER PUBLICATIONS

F. Sato, M. Higashi, T. Sugiyama, Development of Auxiliary Power Supply System for Electric Power Steering, JTEKT Engineering Journal No. 1013, 2015, p. 41-46.

*Primary Examiner* — Bickey Dhakal
(74) *Attorney, Agent, or Firm* — Maschoff Brennan

(57) ABSTRACT

A control device controls a multi-phase rotating machine having two multi-phase winding sets of two systems and outputting a torque to a common output shaft. The control device includes: two electric power converters individually connected to two power supplies and supplying an AC electric power to the multi-phase winding sets; and a control unit. The power supplies includes a charge side power supply and a discharge side power supply. The control unit energizes a charge side system and a discharge side system with reciprocal currents, and executes a charge operation from the discharge side power supply to the charge side power supply via the multi-phase rotating machine.

19 Claims, 23 Drawing Sheets

(56) References Cited

U.S. PATENT DOCUMENTS

| | | | | |
|---|---|---|---|---|
| 2015/0231978 A1* | 8/2015 | Danner | ................... | B60L 53/24 |
| | | | | 307/10.1 |
| 2018/0029485 A1* | 2/2018 | Danner | ................... | B60L 53/24 |
| 2018/0309397 A1* | 10/2018 | De Wergifosse | ...... | H02K 17/42 |
| 2019/0296664 A1* | 9/2019 | Matsubara | ................ | H02P 6/12 |
| 2019/0299808 A1* | 10/2019 | Oyama | ................... | B60L 58/22 |
| 2023/0226936 A1* | 7/2023 | Haghbin | ................. | B60L 53/16 |
| | | | | 701/22 |

* cited by examiner

IN CASE OF SPM MOTOR

Ichg LARGE

IN CASE OF IPM MOTOR

IN CASE OF FLOWING d AXIS
CURRENT VIA SPM MOTOR

STRENGTHEN FIELD
ON DISCHARGE SIDE

IN CASE OF FLOWING d AXIS
CURRENT VIA SPM MOTOR

STRENGTHEN FIELD ON BOTH DISCHARGE
AND CHARGE SIDES

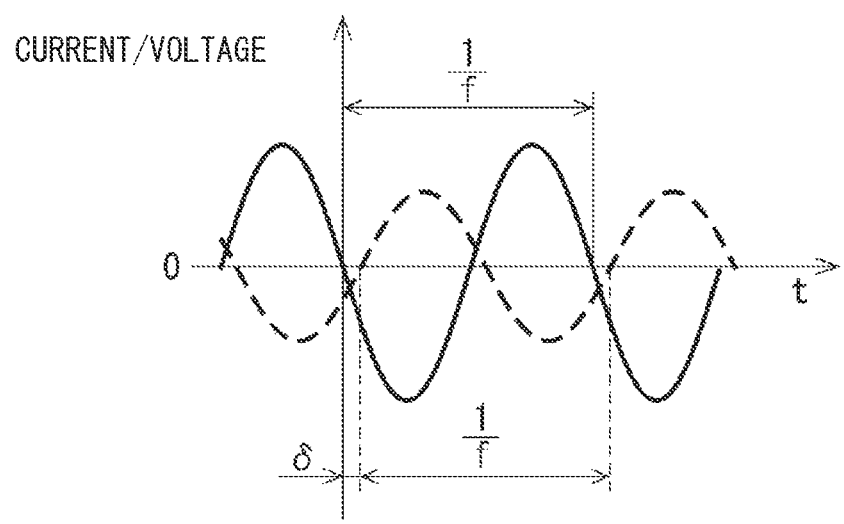

CONTROL DEVICE FOR MULTI-PHASE ROTATING MACHINE

CROSS REFERENCE TO RELATED APPLICATION

The present application is a continuation application of International Patent Application No. PCT/JP2021/017571 filed on May 7, 2021, which designated the U.S. and claims the benefit of priority from Japanese Patent Application No. 2020-083955 filed on May 12, 2020. The entire disclosures of all of the above applications are incorporated herein by reference.

TECHNICAL FIELD

The present disclosure relates to a control device for a multi-phase rotating machine.

BACKGROUND

Conventionally, a device capable of exchanging electric power between two power sources for supplying electric power to a multi-phase rotating machine is known. For example, a conceivable technique teaches an electric power steering device in which a capacitor as an auxiliary power source is provided in a power supply path from a battery as a main power source to an assist motor. Depending on the temperature of the capacitor, the charging state in which the capacitor is charged with electric charge by the power supply from the battery and the holding state in which the charged charge is held in the capacitor are switched.

SUMMARY

According to an example, a control device controls a multi-phase rotating machine having two multi-phase winding sets of two systems and outputting a torque to a common output shaft. The control device includes: two electric power converters individually connected to two power supplies and supplying an AC electric power to the multi-phase winding sets; and a control unit. The power supplies includes a charge side power supply and a discharge side power supply. The control unit energizes a charge side system and a discharge side system with reciprocal currents, and executes a charge operation from the discharge side power supply to the charge side power supply via the multi-phase rotating machine.

BRIEF DESCRIPTION OF THE DRAWINGS

The above and other objects, features and advantages of the present disclosure will become more apparent from the following detailed description taken in conjunction with the accompanying drawings. In the drawings:

FIG. 14C is a waveform diagram showing an example of high frequency current/voltage;

DETAILED DESCRIPTION

Figure 1:
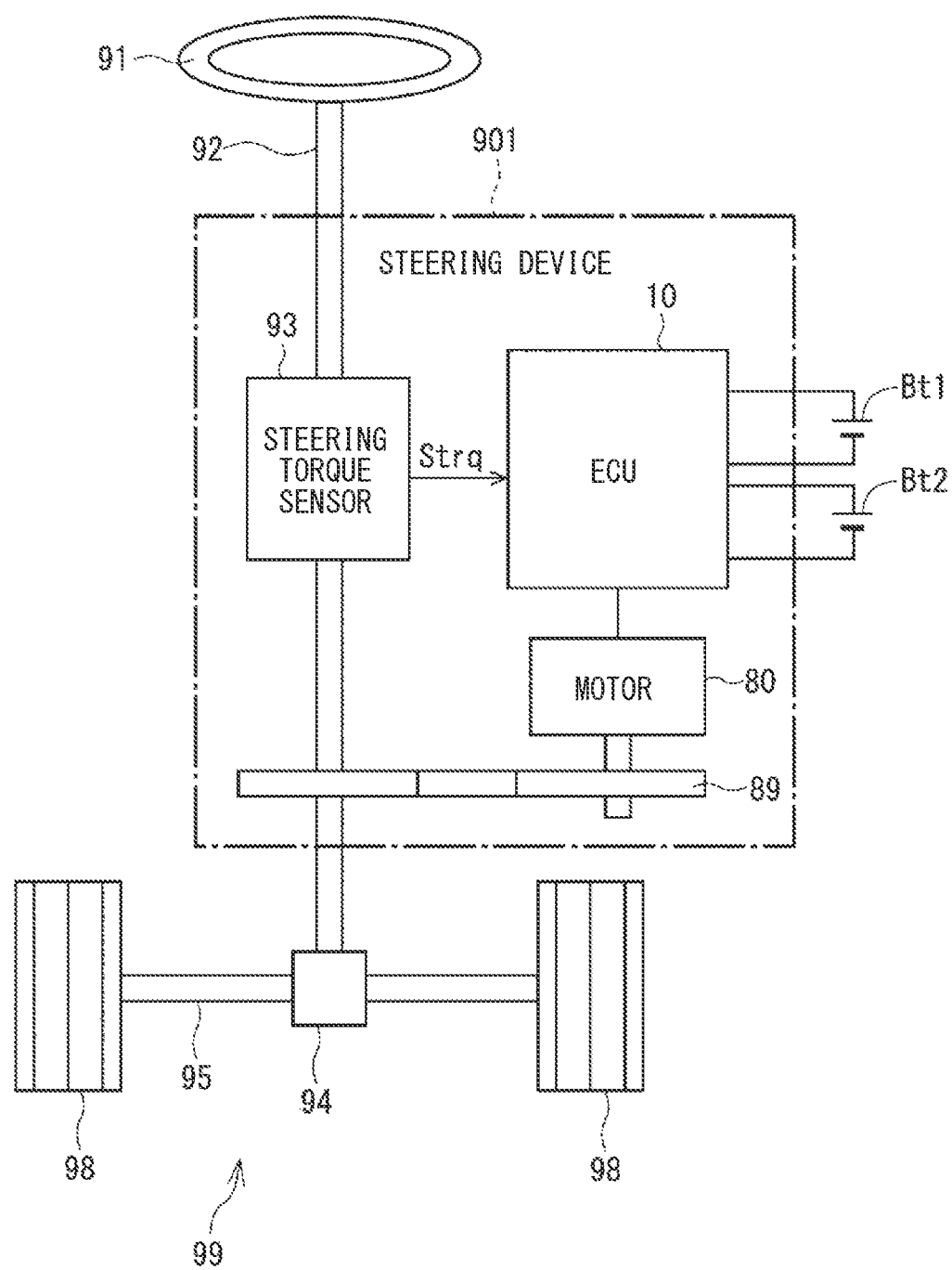
FIG. 1 is a schematic configuration diagram of a steering device to which a control device (i.e., ECU) for a multi-phase rotating machine according to the first to third embodiments is applied.

The device of the conceivable technique supplies electric power to an assist motor from two different types of power sources, a battery and a capacitor, via a common motor drive circuit. On the other hand, in a system in which power is supplied from electric power converters in two systems to a double-winding rotating machine having two sets of multi-phase winding sets, in a so-called "complete two-system" configuration, two batteries are individually connected to the power converters of two systems. The conceivable technique does not suggest the electric power transfer between two power sources in a complete two-system configuration.

An object of the present embodiments is to provide a control device for a multi-phase rotating machine capable of exchanging electric power between two power sources in a configuration in which a double winding rotating machine is energized by two power sources.

The present embodiments provide a control device for controlling a drive of a double winding type multi-phase rotating machine that has two multi-phase winding sets magnetically coupled to each other, and outputs the torque, generated by energizing the multi-phase winding set of each system and added to each other, to a common output shaft. The control device of this multi-phase rotating machine includes two systems of power converters and a control unit.

The power converters of two systems are respectively connected to two power sources in at least some drive modes, convert the direct current electric power input from the power sources into alternating current electric power and supply the electric power to the multi-phase winding set. The control unit controls the operation of the power converter and controls the energization of the multi-phase winding set.

Of the two power sources, one of the power sources that needs to be charged is referred to as the "a charge side power source", and the other of the power sources on the other side of the charge side power source is referred to as the "discharge side power source". The "necessity of charging" may not require the generation of a request signal or the like, and it is sufficient if the possibility that charging is required is presumed.

The control unit energizes the "charge side system" connected to the charge side power supply and the "discharge side system" connected to the discharge side power supply with reciprocal currents whose actions on the multi-phase winding set are opposite to each other, so that the control unit performs the charge operation from the discharge side power supply to the charge side power supply via the multi-phase rotating machine. In the present disclosure, it is possible to exchange the electric power between two power sources by using the magnetic coupling of the double winding rotating machine.

For example, when performing a charge operation, the control unit energizes the charge side system so that torque in the direction opposite to the rotation direction of the multi-phase rotating machine is generated, and energizes the discharge side system so that torque to supplement the torque in the opposite direction is generated. Alternatively, when performing the charge operation, the control unit energizes a high-frequency current of 1 kHz or higher, which has the same frequency and opposite magnitude relations with respect to the center of amplitude at the same time point, or applies the high frequency voltage so as to flow the high frequency current. Preferably, the control unit switches between two types of charge operations according to the operation state of the multi-phase rotating machine.

Hereinafter, a plurality of embodiments of the control device for the multi-phase rotating machine according to the present disclosure will be described with reference to the drawings. In the first to third embodiments, the ECU as the "control device for the multi-phase rotating machine" is applied to the steering device of the vehicle and controls the energization of the steering assist motor including the double winding motor. In the following embodiments, substantially same structural parts are designated with the same reference numerals thereby to simplify the description.

First, the configuration of the steering device to which the ECU of the first to third embodiments is applied will be described with reference to FIG. 1. As shown in FIG. 1, the ECU 10 is applied to the steering device 901 of the vehicle 99. FIG. 1 shows a steering device of an electric power steering (EPS) system in which a steering mechanism and a turning mechanism are mechanically connected. Although the EPS system of FIG. 1 is a column type, it may be applied to a rack type EPS system. Further, the ECU 10 may be applied to a steering device of a steer-by-wire system in which the steering mechanism and the turning mechanism of the vehicle 99 are mechanically separated.

In the vehicle 99, the steering shaft 92 is connected to the steering wheel 91. The pinion gear 94 provided at an axil end of the steering shaft 92 engages with the rack shaft 95. The pair of road wheels 98 is provided at both ends of the rack shaft 97 via, for example, tie rods. When the driver rotates the steering wheel 91, the rotational movement of the steering shaft 92 is converted into a linear movement of the rack shaft 95 via the pinion gear 94, and the pair of wheels 98 are turned at an angle corresponding to the amount of displacement of the rack shaft 97.

The steering device 901 includes a steering torque sensor 93, an ECU 10, a motor 80 as a "multi-phase rotating machine", a reduction gear 89, and the like. The steering torque sensor 93 is provided in the middle of the steering shaft 92, detects the steering torque of the driver, and outputs it as a torque sensor signal Strq. The ECU 10 connected to the two power supplies Bt1 and Bt2 controls the drive of the motor 80 so that the motor 80 generates a desired assist torque based on the torque sensor signal Strq. The assist torque generated by the motor 80 is transmitted to the steering shaft 92 via the reduction gear 89.

First Embodiment

Next, the configuration of the motor drive system 201 of the first embodiment will be described with reference to FIGS. 2 to 4. Hereinafter, a system including two power supplies Bt1, Bt2, ECU 10 and a motor 80 will be referred to as a "motor drive system". The ECU 10 includes inverters 601 and 602 as "two systems of power converters", a control unit 40, and the like. The configurations of the ECU 10 and the motor 80 of the first to third embodiments are substantially the same, and the connection configurations of the two power supplies Bt1 and Bt2 are different.

Figure 2:
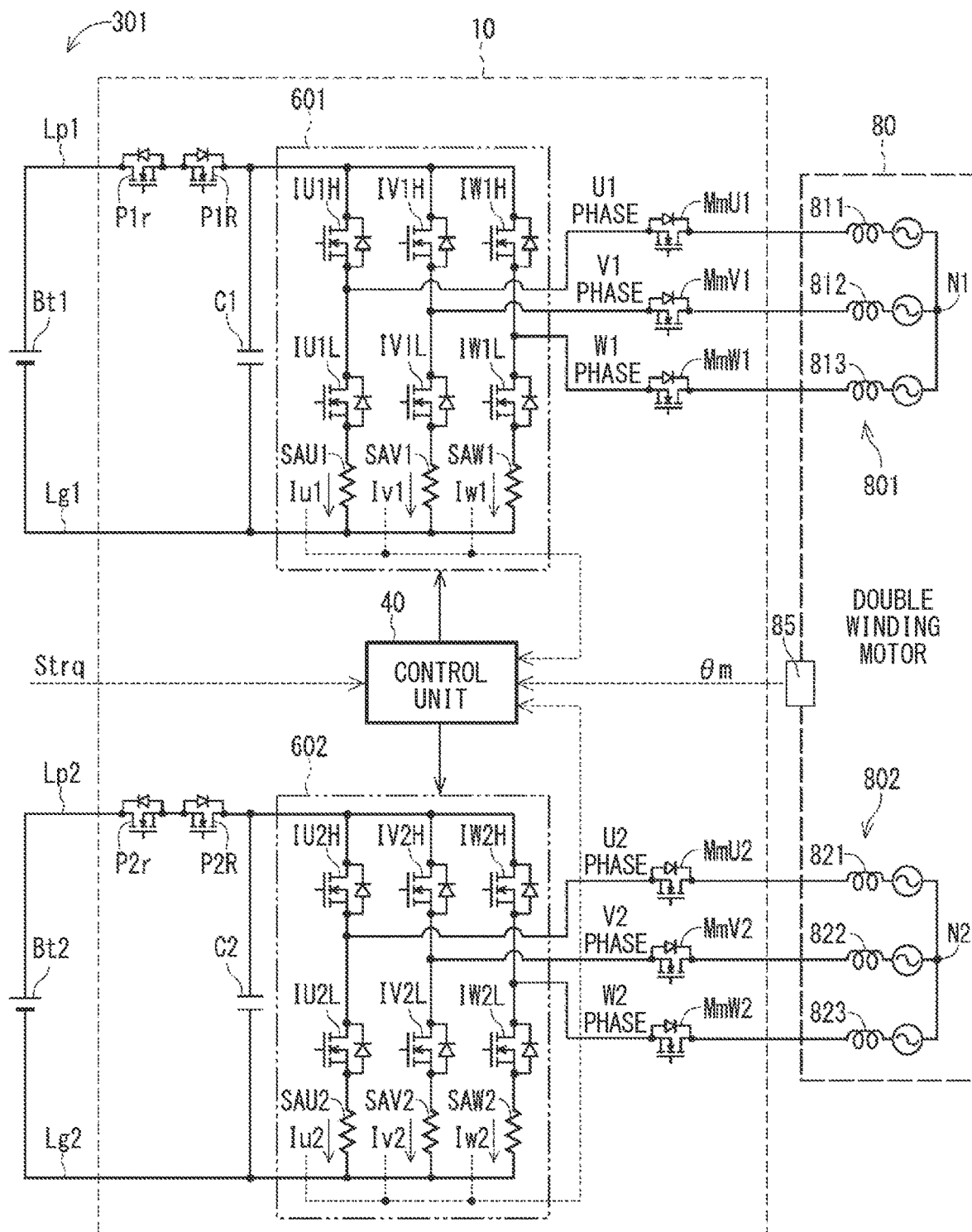
FIG. 2 is a circuit configuration diagram of a dual power supply motor drive system according to the first embodiment.

FIG. 2 shows a circuit configuration including various relays and current sensors in addition to the inverters 601 and 602 and the motor 80 common to each embodiment. It should be noted that various relays and current sensors may not be essential configurations, alternatively, they may be provided as options according to the application. Hereinafter, the unit of a group of components including the power supplies Bt1, Bt2, the inverters 601 and 602, and the three-phase winding sets 801 and 802 of the motor 80 is referred to as a "system". In the present disclosure, if necessary, the configuration element or the signal in the first system has a beginning of term of "first," and the configuration element or the signal in the second system has a beginning of term of "second". Further, "1" is added to the end or in the middle of the code of the component or signal of the first system, and "2" is added to the end or in the middle of the code of the component or signal of the second system.

The motor 80 has two systems of three-phase winding sets 801 and 802. The first system three-phase winding set (hereinafter referred to as "first three-phase winding set")

801 is configured by connecting U1 phase, V1 phase, and W1 phase windings 811, 812, and 813 at the neutral point N1. A voltage is applied from a first system inverter (hereinafter, "first inverter") 601 to the U1-phase, V1-phase, and W1-phase windings 811, 812, 813 of the first three-phase winding set 801.

The second system three-phase winding set (hereinafter referred to as "second three-phase winding set") 802 is configured by connecting U2 phase, V2 phase, and W2 phase windings 821, 822, and 823 at the neutral point N2. A voltage is applied from a second system inverter (hereinafter, "second inverter") 602 to the U2-phase, V2-phase, and W2-phase windings 821, 822, 823 of the second three-phase winding set 802.

Figure 3:
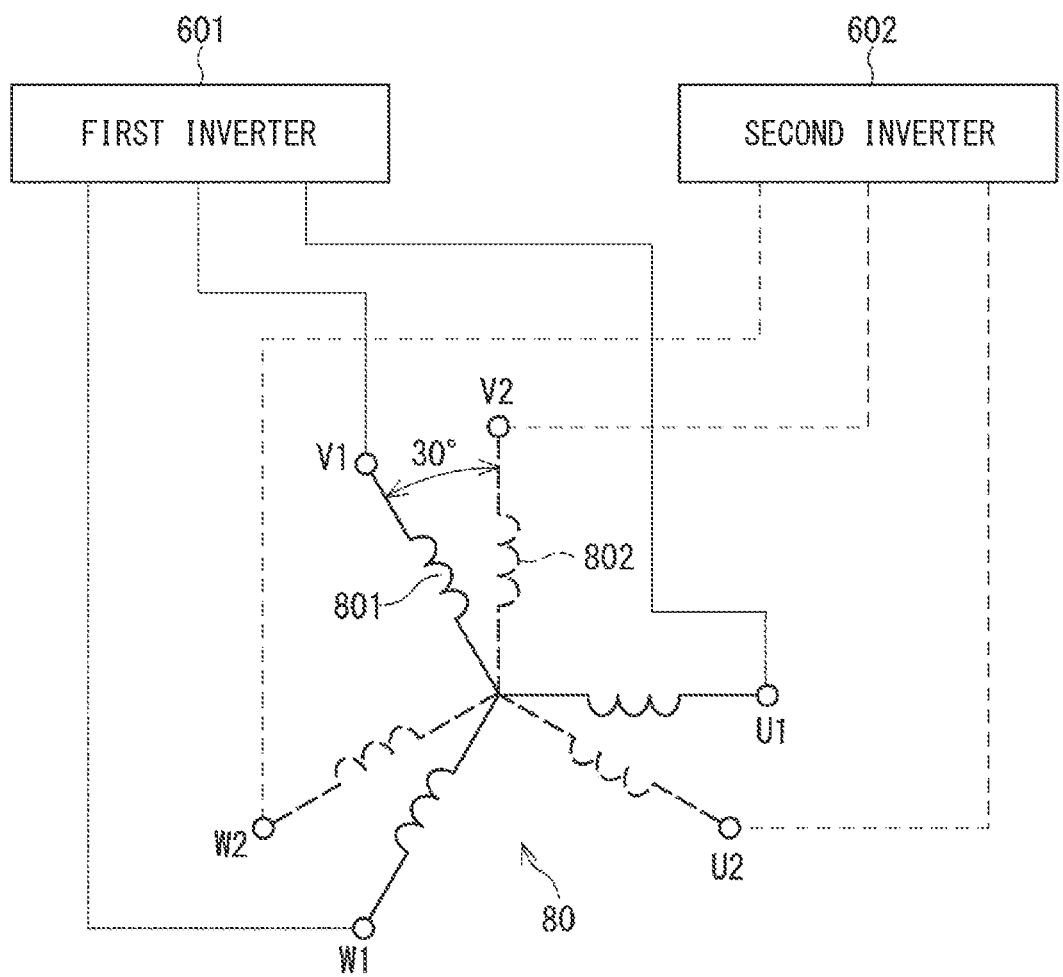
FIG. 3 is a schematic diagram showing a configuration of a double winding motor.

As shown in FIG. 3, the motor 80 is a double winding motor in which two systems of three-phase winding sets 801 and 802 that are magnetically coupled to each other are coaxially provided. The three phase winding sets 801 and 802 have the same electrical characteristics and are wound on a common stator while being shifted from each other by an electrical angle of 30 degrees. For this reason, the phase currents supplied to the three phase winding sets 801 and 802 are controlled to have a same amplitude and a phase difference of 30 degrees. In the double winding motor 80, the torque generated by energizing the three-phase winding sets 801 and 802 of the systems is added up and output to a common output shaft. Returning to FIG. 2, the rotation angle sensor 85 detects the rotation angle θm of the motor 80.

In the first embodiment, the inverters 601 and 602 are always individually connected to the two power supplies Bt1 and Bt2. That is, the motor drive system 201 has a so-called "complete two-system" configuration. Hereinafter, the configuration of the first system will be described as a representative. The inverter 601 is connected to the positive electrode of the power supply Bt1 via the high potential line Lp1, and is connected to the negative electrode of the power supply Bt1 via the low potential line Lg1. A capacitor C1 is provided between the high potential line Lp1 and the low potential line Lg1 on the power supply Bt1 side of the inverter 601.

The inverter 601 has a plurality of switching elements IU1H, IU1L, IV1H, IV1L, IW1H, and IW1L on the high potential side and the low potential side connected by a bridge. Specifically, the switching elements IU1H, IV1H, and IW1H are upper arm elements provided on the high potential side of the U1 phase, the V1 phase, and the W1 phase, respectively, and the switching elements IU1L, IV1L, and IW1L are U1 phase and V1 are lower arm elements provided on the low potential side of the U1 phase, the V1 phase, and the W1 phase.

The inverter 601 converts the DC power input from the power supply Bt1 into AC power by the operation of each phase upper and lower arm elements and supplies it to the three-phase winding set 801. The switches and relays used in the present embodiment, including these upper and lower arm elements, are, for example, MOSFETs. Each switch or relay may include a semiconductor switching element other than the MOSFET, a mechanical relay, or the like.

Current sensors SAU1, SAV1, and SAW1 for detecting the phase currents Iu1, Iv1, and Iw1 flowing through each phase are arranged between the lower arm elements IU1L, IV1L, and IW1L of each phase of the inverter 601 and the low potential line Lg1. The current sensors SAU1, SAV1, and SAW1 include, for example, a shunt resistor.

In the current path between the power supply Bt1 and the capacitor C1, the power supply relay P1*r* is connected in series on the power supply Bt1 side, and the reverse connection protection relay P1R is connected in series on the capacitor C1 side. The power supply relay P1*r* and the reverse connection protection relay P1R can cut off the energization from the power supply Bt1 to the inverter 601 when the power supply relay P1*r* and the reverse connection protection relay P1R are off. The power relay P1*r* cuts off the current in the flowing direction when the electrodes of the power Bt1 are connected in the normal direction. The reverse connection protection relay P1R cuts off the current in the flowing direction when the electrodes of the power supply Bt1 are connected in the direction opposite to the normal direction.

Motor relays MmU1, MmV1, and MmW1 are provided in each phase current path between the inverter 601 and the three-phase winding set 801. The motor relays MmU1, MmV1, and MmW1 can cut off the current flowing in the regenerative direction from the three-phase winding set 801 to the inverter 601 when the motor relays MmU1, MmV1, and MmW1 are off.

Regarding the second system, the codes of the switching element, the capacitor, the current sensor, the power supply relay, the reverse connection protection relay, the motor relay, and the like of the second inverter 602 are represented by replacing "1" in the code of the first system with "2". Further, regarding the elements of the second system, the description of the elements of the first system is incorporated.

The control unit 40 includes a microcomputer, a pre-driver, and the like, and has a CPU (not shown), a ROM, a RAM, an I/O, a bus line connecting these configurations, and the like. The control unit 40 performs required control by executing software processing or hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit. The control of the inverters 601 and 602 of each system may be executed by a common microcomputer, or the control of each inverter 601 and 602 may be executed while having a microcomputer for each system and sharing each other's information through communication between the microcomputers.

The control unit 40 outputs a drive signal to the inverters 601 and 602 of the systems based on the torque sensor signal Strq from the steering torque sensor 93. For example, the drive signal is a PWM signal generated based on the dq-axis voltage command value. Further, the control unit 40 performs the current feedback control based on the phase currents Iu1, Iv1, Iw1, Iu2, Iv2, Iw2 detected by the current sensors SAU1, SAV1, SAW1, SAU2, SAV2, and SAW2 of the systems and the motor rotation angle θm detected by the rotation angle sensor 85. In this way, the control unit 40 controls the operation of the inverters 601 and 602 and controls the energization of the motor 80. The control unit of another embodiment may directly control the torque, for example, by determining the command voltage from the deviation of the torque.

Figure 4:
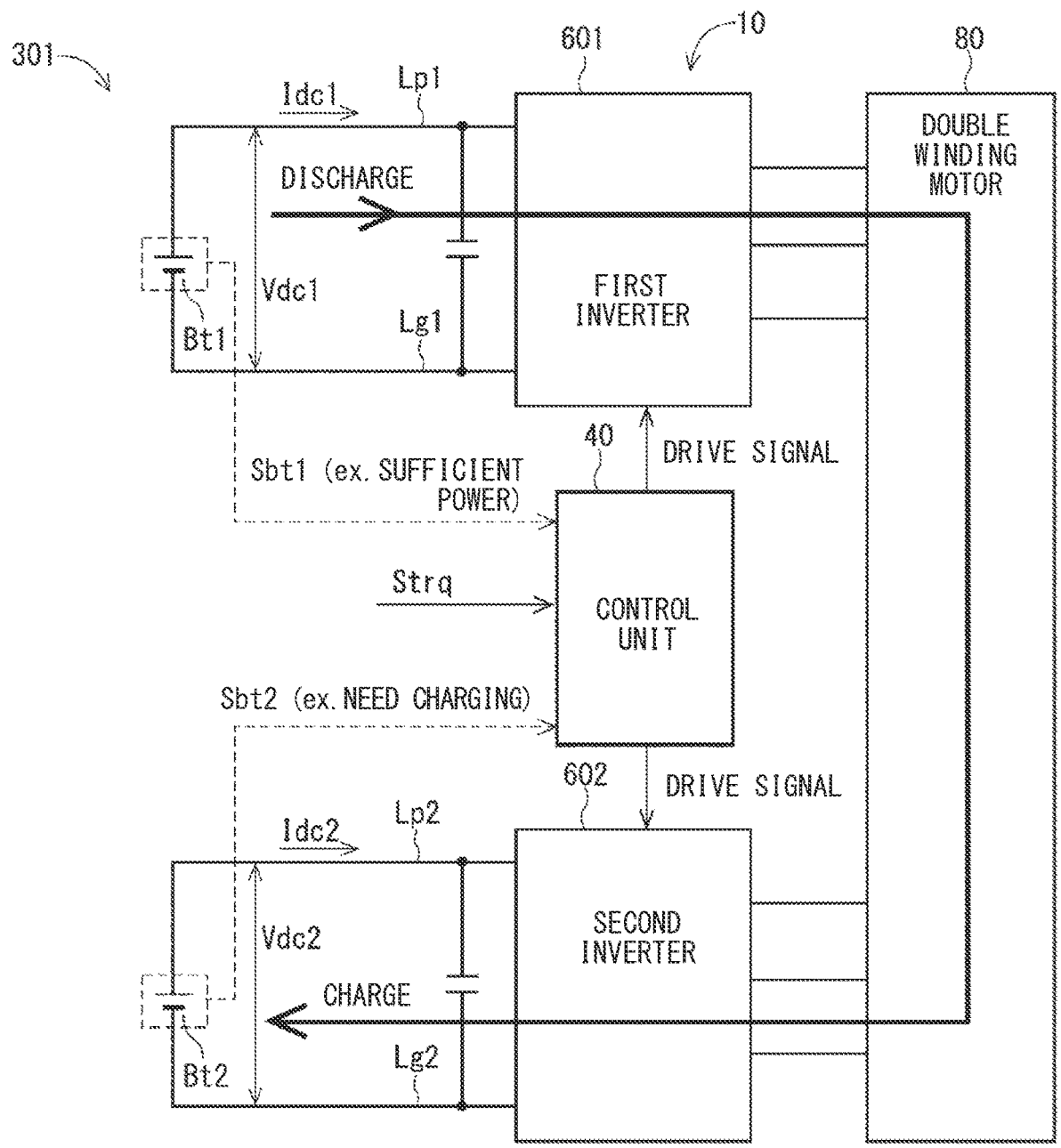
FIG. 4 is a schematic diagram of a dual power supply motor drive system according to a first embodiment.

FIG. 4 is a schematic diagram of a motor drive system 201 that simplifies the circuit configuration of an inverter switching element, a relay, a motor winding set, and the like with respect to FIG. 2. Instead, FIG. 4 shows an image of the connection configuration of the two power supplies Bt1 and Bt2 and the power exchange between the two power supplies Bt1 and Bt2. In the dual power supply motor drive system 201 of the first embodiment, the two power supplies Bt1 and Bt2 are arranged independently.

The voltage of the first power supply Bt1 is defined as the first DC voltage Vdc1, and the current from the first power supply Bt1 to the first inverter 601 is defined as the first direct current Idc1 in the positive direction. The voltage of the second power supply Bt2 is defined as the second DC voltage Vdc2, and the current from the second power supply Bt2 to the second inverter 602 is defined as the second direct current Idc2 in the positive direction. When the second direct current Idc2 flows in the negative direction, the second power supply Bt2 is charged.

The control unit 40 acquires power supply signals Sbt1 and Sbt2 indicating the states of the power supplies Bt1 and Bt2. The power supply signals Sbt1 and Sbt2 include a power supply voltage and a charge request from another ECU such as a power supply ECU. For example, a signal indicating "charge required" is input from the second power supply Bt2, and a signal indicating "sufficient power" is input from the first power supply Bt1. The broken line path shown in FIG. 4 is an example, and the control unit 40 may acquire the power supply signals Sbt1, Sbt2, or a signal in place of the power supply signals Sbt1 and Sbt2 by any path. The control unit 40 may detect the input voltage to the inverters 601 and 602 and determine whether or not charging is necessary, or may determine whether or not charging is necessary based on the amount of electric power consumed by itself.

Of the two power supplies Bt1 and Bt2, one of the power sources that needs to be charged is referred to as the "a charge side power source", and the other of the power sources on the other side of the charge side power source is referred to as the "discharge side power source". The "necessity of charging" may not require the generation of a request signal or the like, and it is sufficient if the possibility that charging is required is presumed. In the following description, the second power supply Bt2 is used as the charge side power source, and the first power source Bt1 is used as the discharge side power source. Further, the second system connected to the charge side power supply is referred to as a "charge side system", and the first system connected to the discharge side power supply is referred to as a "discharge side system". The control unit 40 energizes the charge side system and the discharge side system with a "reciprocal current" described later, and performs the charge operation to the second power source Bt2 as the charge side power supply from the first power supply Bt1 which is the discharge side power source via the double winding motor 80. That is, the control unit 40 transfers electric power between the two power supplies Bt1 and Bt2.

Figure 5A:
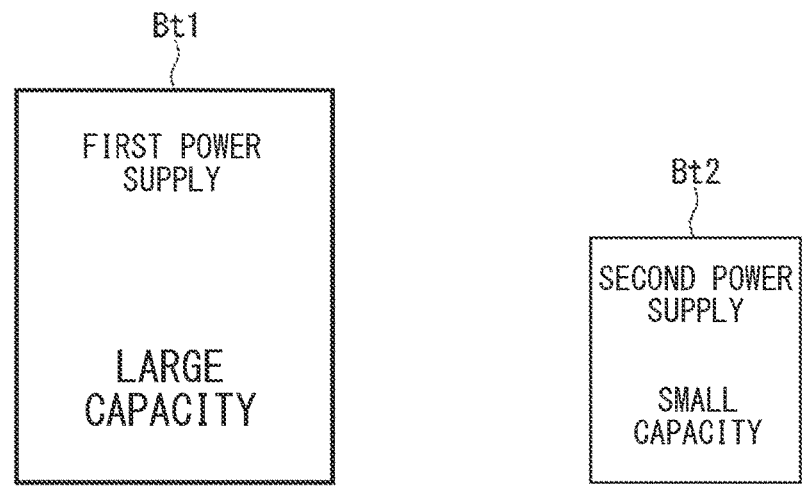
FIG. 5A is an image diagram showing the difference in the capacities of the two power supplies.
Figure 5B:
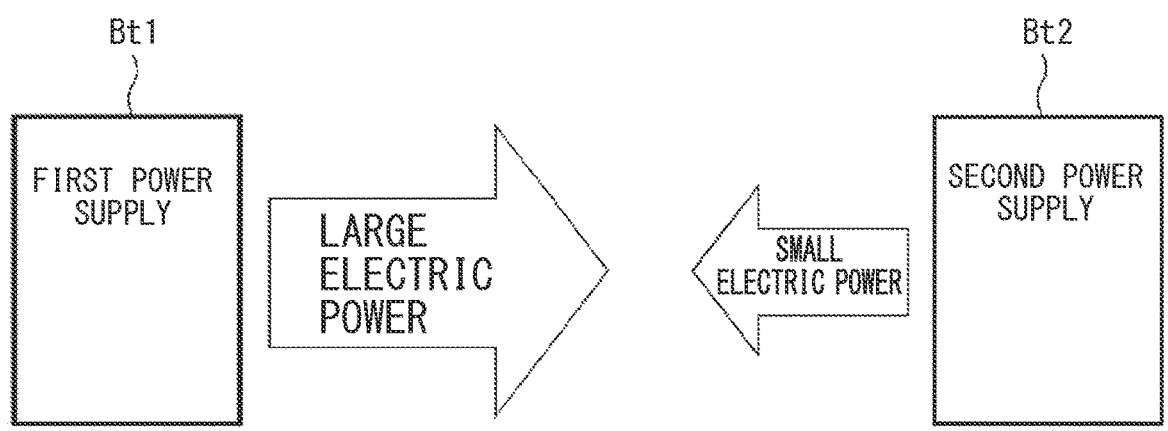
FIG. 5B is an image diagram showing a difference in electric power between two power supplies.

The first power supply Bt1 and the second power supply Bt2 may not be limited to those having the same storage capacity and output power. FIG. 5A shows an image in which the two power supplies Bt1 and Bt2 have different capacities for storing electricity. FIG. 5B shows an image in which the electric powers that can be output by the two power supplies Bt1 and Bt2 are different from each other. Expressed in the dimension of physical quantity, the capacity is a value in the Joule [J] dimension, and the electric power is a value in the watt [W] dimension.

For example, in a vehicle, a battery for a general vehicle may be used as a first power supply Bt1 as a main power source, and a battery for a motorcycle may be used as a second power supply Bt2 as an auxiliary power source. In this case, basically, the first power source Bt1 for a vehicle has a larger capacity that can be stored and a larger electric power that can be output than the second power source Bt2 for a motorcycle. Therefore, the first power supply Bt1 provides the discharge side power supply, and the second power supply Bt2 provides the charge side power supply. Then, in the power source having a smaller outputable electric power, a thin wiring having a larger wiring resistance than the power source having a larger outputable electric power may be used.

Figure 6:
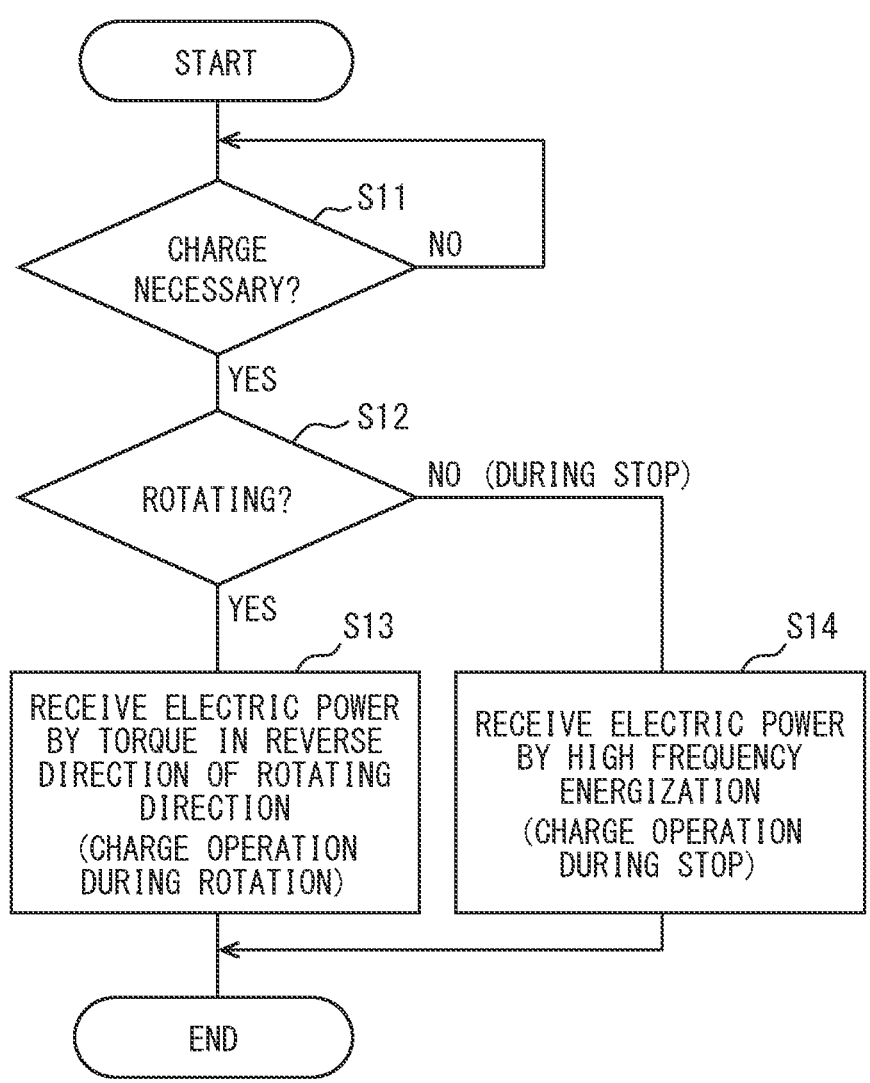
FIG. 6 is a flowchart for switching a charge operation according to an operation state of a motor.

Next, the switching process of the charge operation according to the operating state of the motor 80 will be described with reference to the flowchart of FIG. 6. Supplementary and exceptional processes for the process of FIG. 6 are described in "Other embodiments". In the description of the flowchart, a symbol "S" indicates a step. In S11, it is determined whether or not the second power source Bt2 needs to be charged based on the power supply voltage, the voltage difference between the two systems, the presence or absence of a charge request from another ECU such as the power supply ECU, and the like.

In S12, it is determined whether the motor 80 is rotating based on the number of revolutions, the rotation speed, and the output torque of the motor 80, the current command value, the torque input of the driver, and the like. Since the motor 80 is rotating when the steering wheel 91 is being steered, it is determined to be "YES" in S12, and the process proceeds to S13. Since the motor 80 is stopped while the vehicle is traveling straight, the steering is maintained, or the vehicle is stopped, it is determined to be "NO" in S12, and the process shifts to S14. In the present specification, "stopped" may not be limited to a state in which the rotation is completely stopped, alternatively, the term may also include a low rotation state below a predetermined rotation speed. For example, when the contribution of the ωφterm in the voltage equations (2.2) and (2.4) described later is smaller than the contribution of the R term, it may be regarded as "stopped".

In S13 and S14, the control unit 40 energizes the charge side system and the discharge side system, respectively, with "reciprocal currents having opposite actions on the three-phase winding sets 801 and 802". In S13, as a "charge operation during rotation", electric power is exchanged by torque in the direction opposite to the rotation direction by energizing a reciprocal current. In S14, electric power is transferred and received by high-frequency energization of reciprocal currents as a "charge operation during stop". The end point of the charge operation may be until the capacities or powers of the first power supply Bt1 and the second power supply Bt2 become equal to each other, or until the capacity difference or the power difference becomes equal to or less than a predetermined value. Alternatively, the charge operation may be terminated after charging only for a predetermined power or for a predetermined time.

The charge operation during rotation is an operation using the magnetic flux of the magnet of the double winding motor 80. The control unit 40 energizes the charge side system so as to generate the torque in the direction opposite to the rotation direction of the motor 80, and energizes the discharge side system so as to generate a torque compensating for the torque in the opposite direction. The charge operation during stop is an operation using the mutual inductance of the double winding motor 80. The control unit 40 energizes the charge side system and the discharge side system with high-frequency currents having opposite magnitude relations with respect to the center of amplitude at the same time point. Hereinafter, the details of the charge operation during rotation and the charge operation during stop will be described in order.

Charge Operation During Rotation

Figure 7:
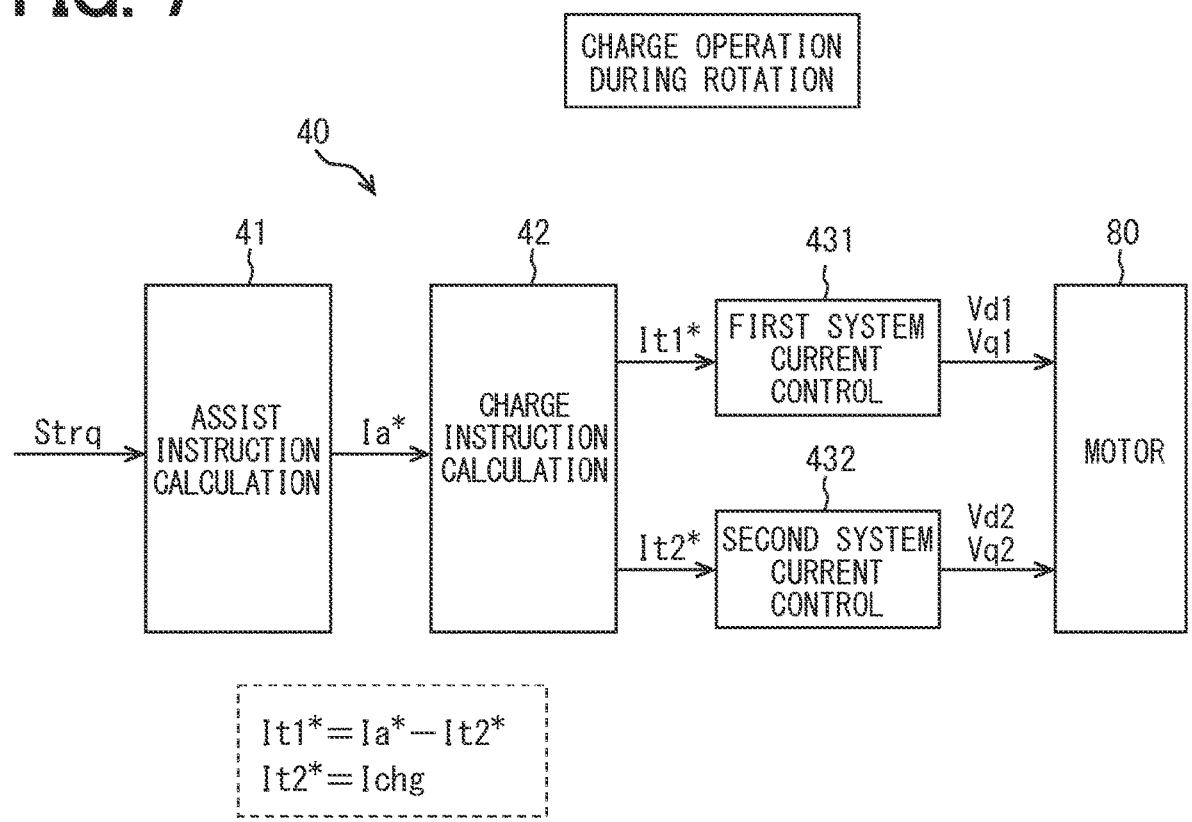
FIG. 7 is a block diagram of a control unit that performs a charge operation during rotation.

The charge operation during rotation will be described with reference to FIGS. 7 to 11B. FIG. 7 shows a block diagram of the control unit 40 related to the charge operation during rotation. In the block diagram, the inverters 601 and 602 are not shown, and the voltage command value calculated by the control unit 40 is shown to be directly output to the motor 80.

The control unit 40 includes an assist command value calculation unit 41, a charge command value calculation unit 42, a first system current control unit 431, and a second system current control unit 432. The assist command value calculation unit 41 calculates the assist command value Ia* based on the torque sensor signal Strq. The charge command value calculation unit 42 calculates the charge current command values It1* and It2* of each system by the equations (1.1) and (1.2) based on the assist command value Ia* and the charging current Ichg.

$$It1^* = Ia^* - It2^* \quad (1.1)$$

$$It2^* = Ichg \quad (1.2)$$

Here, the charge current Ichg may have a variable size and a variable speed at which the size is increased or decreased according to the required charge amount and the number of rotations. Further, the required charge amount is obtained based on the power supply voltage, the voltage difference between the two systems, and signals from other ECUs such as the power supply ECU.

The first system current control unit 431 calculates voltage command values Vd1 and Vq1 based on the charge current command value It1* of the first system. In the SPM motor, the charge current command value It1* is set to the q-axis current command value Iq1e*. In the IPM motor, the q-axis current command value Iq1* and the d-axis current command value Id1* are calculated from the charge current command value It1* by referring to a map or the like. The second system current control unit 432 calculates voltage command values Vd2 and Vq2 based on the charge current command value It2* of the second system.

Figure 8:
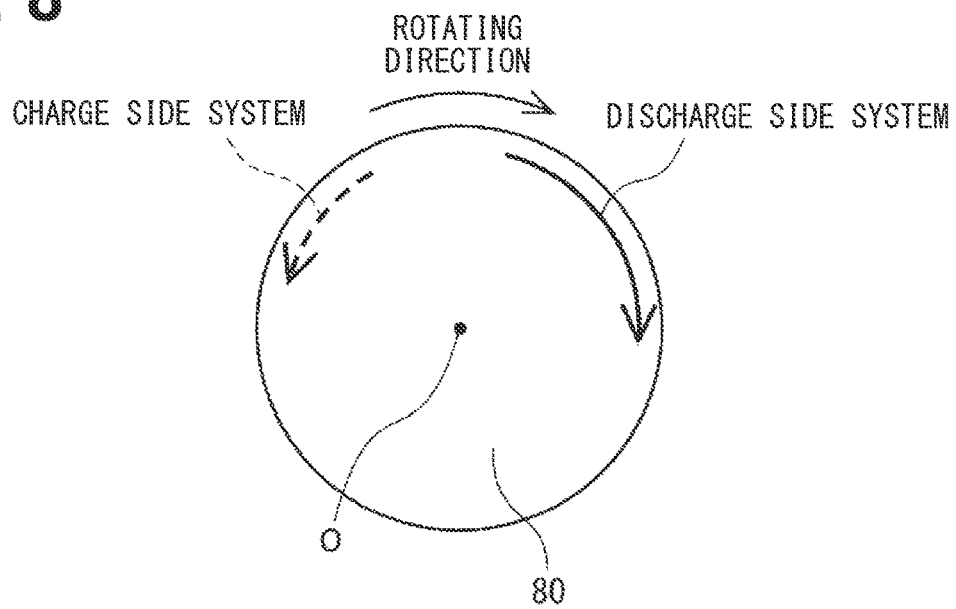
FIG. 8 is an image diagram of a charge operation during rotation.

FIG. 8 shows an image of the charge operation during rotation. The circle in FIG. 8 represents the output shaft of the motor 80 that rotates about the rotation shaft 0. In the charge operation during rotation, the control unit 40 energizes the charge side system so as to generate torque in the direction opposite to the rotation direction of the motor 80, and energizes the discharge side system so as to generate torque to supplement the "reverse torque". Especially in the case of the SPM motor, in the charge operation during rotation, the control unit 40 energizes the q-axis current in the direction opposite to the rotation direction of the motor 80 in the charge side system, and energizes the q-axis current in the discharge side system so as to compensate the "reverse q-axis current".

The technical method of power transfer by torque in the direction opposite to the direction of rotation will be explained. The voltage equation of the double winding motor is expressed by equations (2.1) to (2.4). R is a resistance, L is a self-inductance, M is a mutual inductance, s is a differential operator, w is a rotation speed, and φ is a counter electromotive force constant.

$$Vd1 = (R+Ls)Id1 + Ms \times Id2 - \omega LIq1 - \omega MIq2 \quad (2.1)$$

$$Vq1 = (R+Ls)Iq1 + Ms \times Iq2 + \omega LId1 + \omega MId2 + \omega\varphi \quad (2.2)$$

$$Vd2 = (R+Ls)Id2 + Ms \times Id1 - \omega LIq2 - \omega MIq1 \quad (2.3)$$

$$Vq2 = (R+Ls)Iq2 + Ms \times Iq1 + \omega LId2 + \omega MId1 + \omega\varphi \quad (2.4)$$

Further, the relationship of the electric power between the power supplies Bt1 and Bt2 and the inverters 601 and 602 in each system is expressed by the equations (3.1) and (3.2).

$$Idc1 \times Vdc1 = Id1 \times Vd1 + Iq1 \times Vq1 \quad (3.1)$$

$$Idc2 \times Vdc2 = Id2 \times Vd2 + Iq2 \times Vq2 \quad (3.2)$$

During rotation, when the equation of "ωφ>−{(R+Ls)Iq2+Ms×Iq1+ωLId2+ωMId1}" is satisfied on the right side of the equation (2.4), an equation of "Vq2>0" is satisfied.

At this time, when energized in the direction opposite to the rotation direction, an equation of "Iq2<0" is satisfied. For example, if an equation of "Id2=0" is satisfied, the right side of "Idc2×Vdc2=Iq2×Vq2" is negative in the equation (3.2), so that the second DC current Idc2 becomes negative and the second power supply Bt2 of the charging side system can be charged.

The motor 80 may be rotated by an external force, here, it is assumed that the motor 80 rotates by its own torque. Assuming that K is a constant, it is represented by "torque command=K×(Iq1+Iq2)". The control unit 40 sets the q-axis current Iq2 of the charge side system as a value having a sign opposite to that of the torque command, and energizes the q-axis current Iq2 in the direction opposite to the rotation direction. On the other hand, the control unit 40 increases the q-axis current Iq1 of the discharge side system so as to supplement the q-axis current Iq2 in the opposite direction. As a result, it is possible to discharge from the first power source Bt1 and charge the second power source Bt2 while suppressing the torque that hinders the rotation. Even if Id2 is negative, when Iq2 is increased by that amount, Idc2 becomes negative on the left side of the equation (3.2). Therefore, the second power source Bt2 of the charge side system can be charged. When a large torque is required for the motor, charging may be temporarily stopped and priority may be given to outputting the torque, or the output torque may be limited during the charge according to the need for charging.

Figure 9:
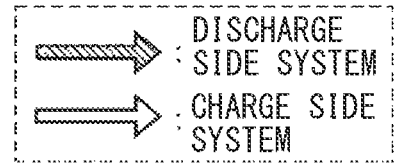
FIG. 9 is a diagram showing an example of energization in the case of an SPM motor.
Figure 9:
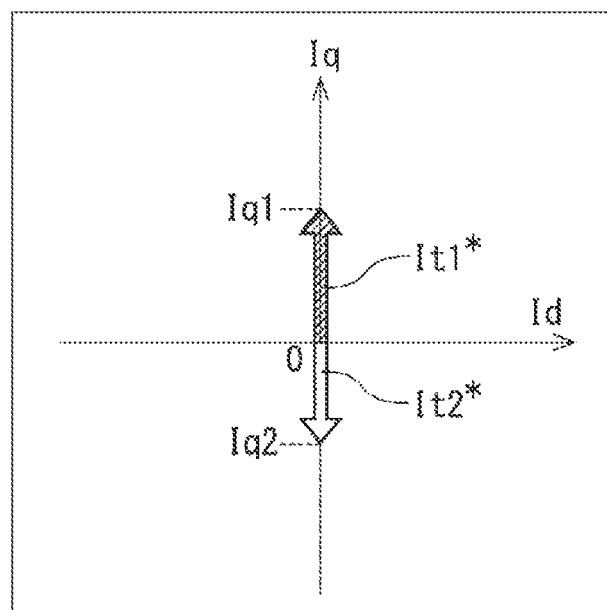
Figure 9:
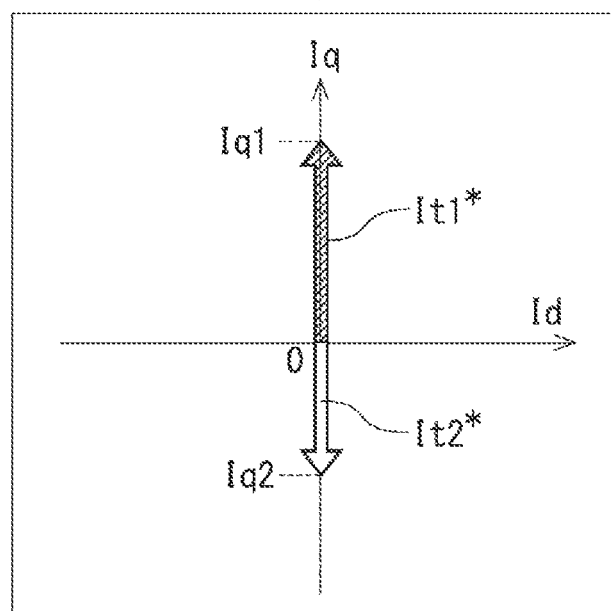

FIGS. 9 to 11B show an example of energization in the charge operation during rotation, that is, an example of calculation of the charge current command values It1* and It2*. FIG. 9 shows an example of energization in the case of an SPM motor. The control unit 40 does not flow the d-axis current in both the discharge side system and the charge side system, but flows only the q-axis current. The control unit 40 causes a negative q-axis current Iq2 in the direction opposite to the rotation direction to flow in the charge side system, and a positive q-axis current Iq1 in the discharge side system so as to supplement the q-axis current in the opposite direction. The absolute value of the q-axis current Iq2 of the charge side system is smaller than the absolute value of the q-axis current Iq1 of the discharge side system. The larger the charge current Ichg, the larger the absolute values of the q-axis currents Iq1 and Iq2 of the discharge side system and the charge side system are increased by the control unit 40.

Figure 10:
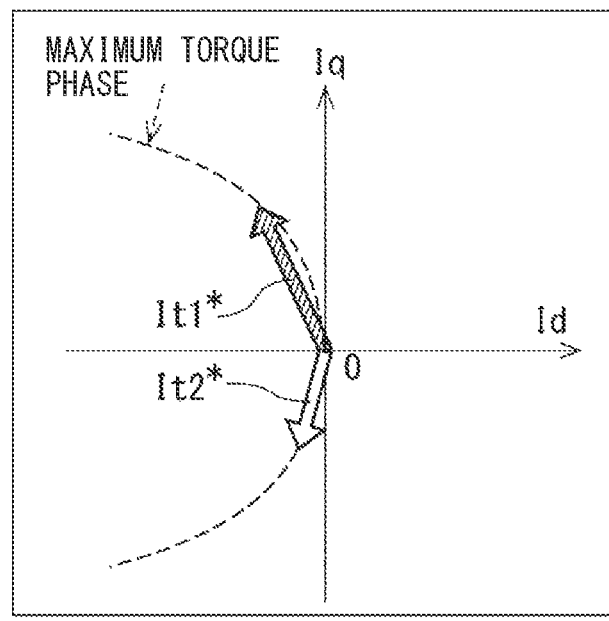
FIG. 10 is a diagram showing an example of energization in the case of an IPM motor.
Figure 10:
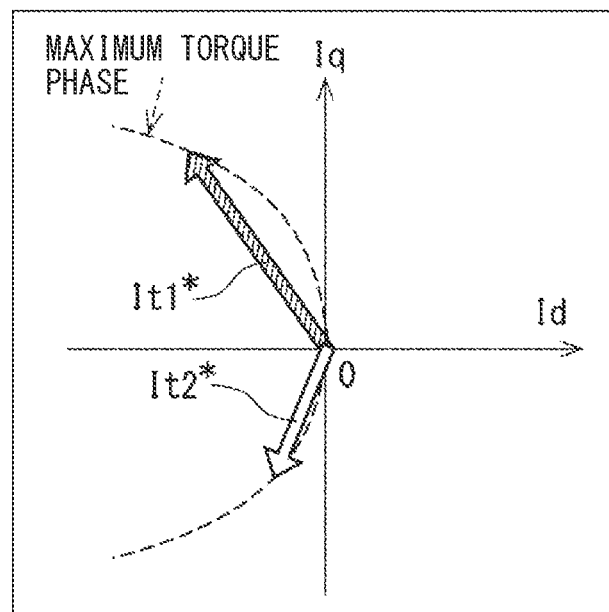

FIG. 10 shows an example of energization in the case of an IPM motor. The control unit 40 calculates the charge current command value It1* along the maximum torque phase in the region where the q-axis current is positive in the discharge side system, and calculates the charge current command value It2* along the maximum torque phase in the region where the q-axis current is negative in the charge side system. The larger the charge current Ichg, the larger the magnitudes of the vectors of the charge current command values It1* and It2* of the discharge side system and the charge side system are increased by the control unit 40.

Figure 11A:
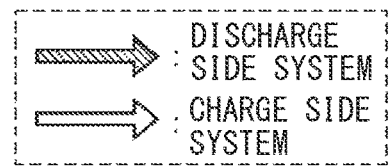
FIG. 11A is a diagram showing an example of energization when flowing a d-axis current by an SPM motor.
Figure 11A:
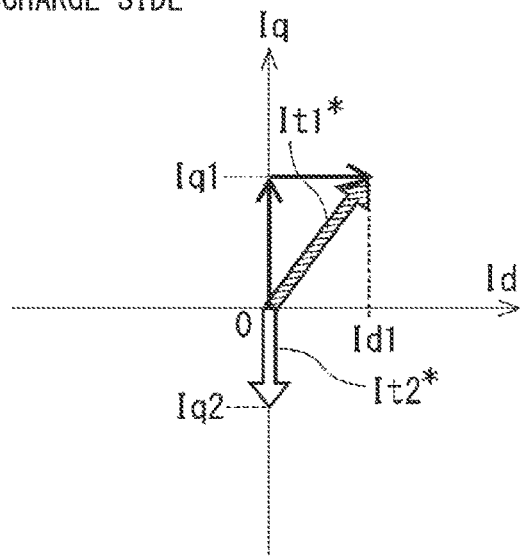
Figure 11B:
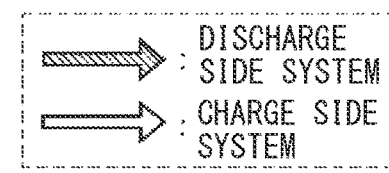
FIG. 11B is a diagram showing an example of energization when flowing a d-axis current by an SPM motor.
Figure 11B:
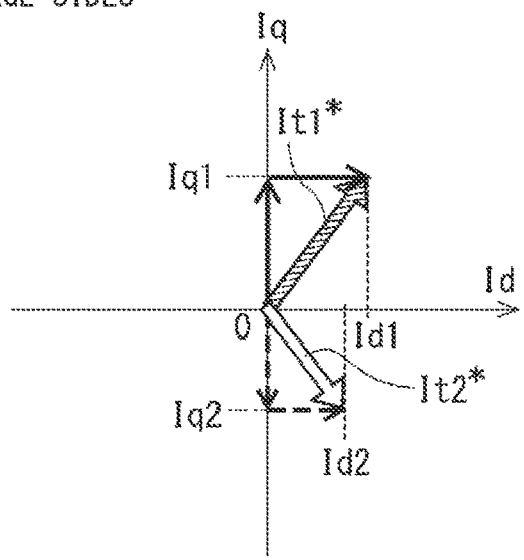

FIGS. 11A and 11B show an example of energization when a d-axis current is passed by an SPM motor. In the example shown in FIG. 11A, the control unit 40 causes a positive q-axis current Iq1 and a positive d-axis current Id1 to flow in the discharge side system to strengthen the discharge side field. In the charge side system, only the negative q-axis current Iq2 flows. In the example shown in FIG. 11B, the control unit 40 further causes a negative q-axis current Iq2 and a positive d-axis current Id2 to flow in the charge side system to strengthen the field on both the discharge side and the charge side. Charging may be performed while performing field weakening in which the d-axis current flows in the negative direction, but the amount of charging is reduced. Under operating conditions that require a field weakening, assist may be prioritized and charging may not be performed.

Charge Operation while Stopped

Figure 12A:
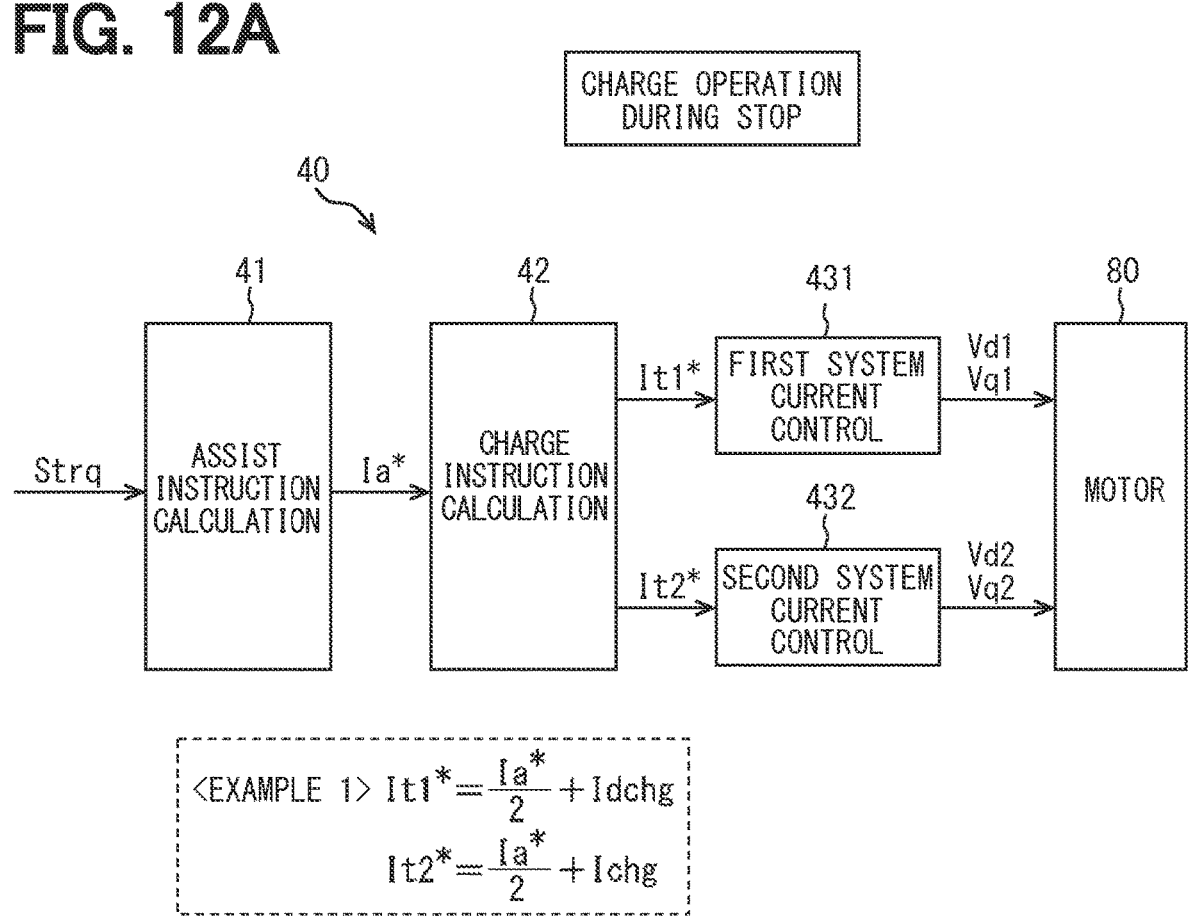
FIG. 12A is a block diagram of a configuration example 1 of a control unit that performs a charge operation while stopped.
Figure 12B:
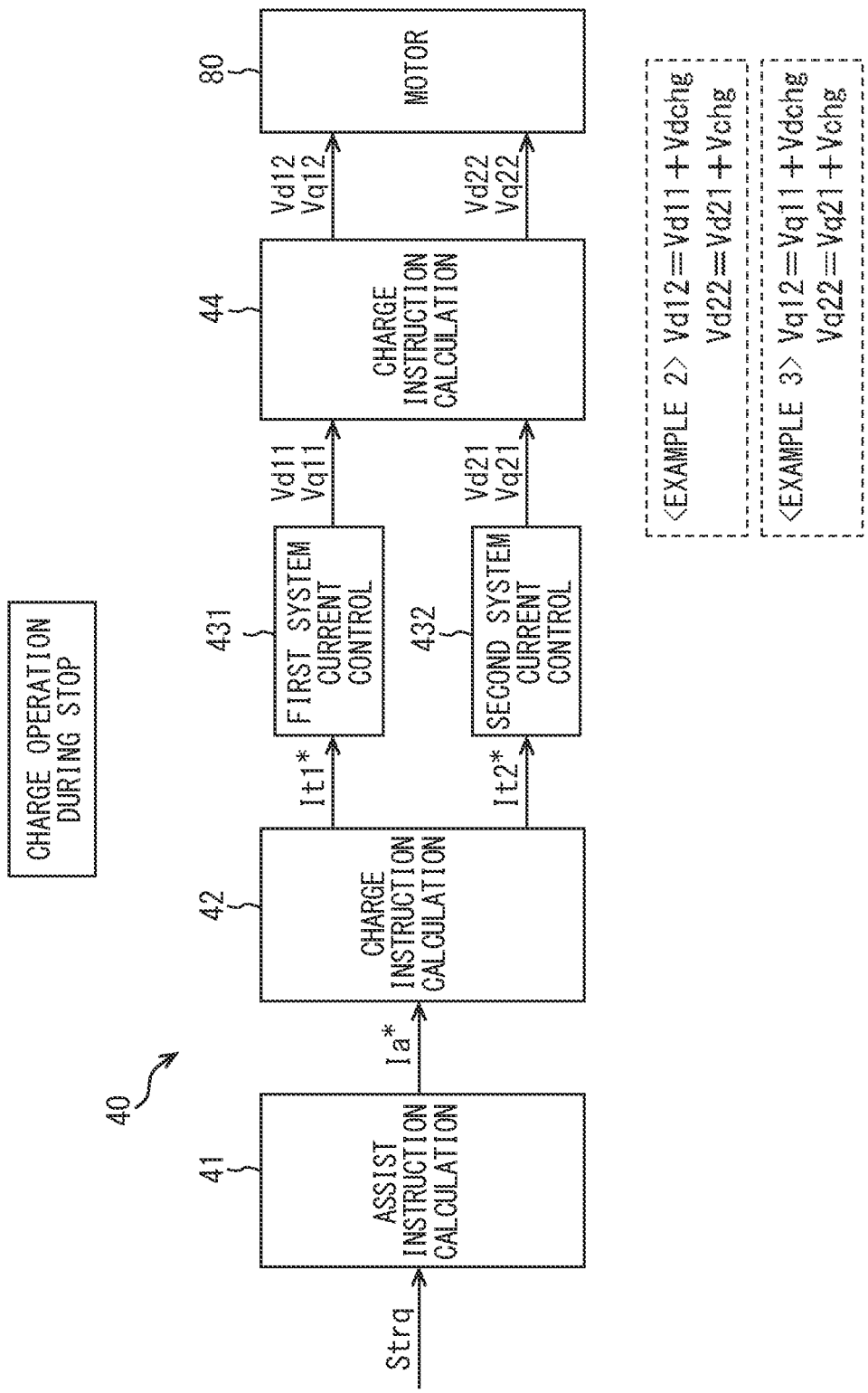
FIG. 12B is a block diagram of a configuration example 2 of a control unit that performs a charge operation while stopped.

A charge operation during a stop will be described with reference to FIGS. 12A to 16C. FIGS. 12A and 12B show a block diagram of the control unit 40 related to the charge operation while stopped. The block diagram of the configuration example 1 shown in FIG. 12A is the same as that of FIG. 7. The difference from the configuration of the charge operation during rotation is that in the stop charge operation, the charge command value calculation unit 42 calculates the charging current command values It1* and It2* of each system using the equations (4.1) and (4.2) of Example 1 based on the assist command value Ia*, the charge current Ichg, and the discharge current Idchg.

$$It1^* = (Ia^*/2) + Idchg \tag{4.1}$$

$$It2^* = (Ia^*/2) + Ichg \tag{4.2}$$

Here, the charge current Ichg and the discharge current Idchg may have variable amplitudes and frequencies according to the required charge amount and the rotation speed. Further, the required charge amount is obtained based on the power supply voltage, the voltage difference between the two systems, and signals from other ECUs such as the power supply ECU. The description of the first system current control unit 431 and the second system current control unit 432 is the same as the charge operation during rotation. During the stop, the assist command value Ia* is often 0 or a relatively small value, and the generation of heat when the d-axis current is applied is suppressed to a low level. Conversely, in the charge operation during rotation in which the assist command value Ia* is relatively large, the energization of the d-axis current may be limited from the viewpoint of suppressing heat generation.

In the configuration example 2 shown in FIG. 12B, the control unit 40 further includes a charging command value calculation unit 44 after the first system current control unit 431 and the second system current control unit 432. The charging command value calculation unit 44 calculates secondary voltage command values Vd12 and Vq12 based on the primary voltage command values Vd11 and Vq11 output by the first system current control unit 431. Further, the charge command value calculation unit 44 calculates secondary voltage command values Vd22 and Vq22 based on the primary voltage command values Vd21 and Vq21 output by the second system current control unit 432.

For example, the charge command value calculation unit 44 calculates the secondary d-axis voltage command values Vd12 and Vd22 of each system by the equations (5.1) and (5.2) of Example 2. Alternatively, the charging command value calculation unit 44 calculates the secondary q-axis voltage command values Vq12 and Vq22 of each system by the equations (5.3) and (5.4) of Example 3. The charge voltage Vchg and the discharge voltage Vdchg are voltages applied so that the charge current Ichg and the discharge current Idchg flow.

$$Vd12 = Vd11 + Vdchg \tag{5.1}$$

$$Vd22 = Vd21 + Vchg \tag{5.2}$$

$$Vq12 = Vq11 + Vdchg \tag{5.3}$$

$$Vq22 = Vq21 + Vchg \tag{5.4}$$

As described above, in the charge operation during the stop, the process is executed by flowing the charge current Ichg and the discharge current Idchg through the two systems of the three-phase winding sets 801 and 802, or applying the charge voltage Vchg and the discharge voltage Vdchg so that the currents flow. By doing so, if the calculation cycle is shortened only by the charge command value calculation, a high frequency current can be passed, and the influence on the calculation load is small. In Example 2, a calculation example using the d-axis voltage and the q-axis voltage is shown, alternatively, charging/discharging can also be performed by performing similar calculations for the voltage of each phase and the duty ratio.

Figure 13:
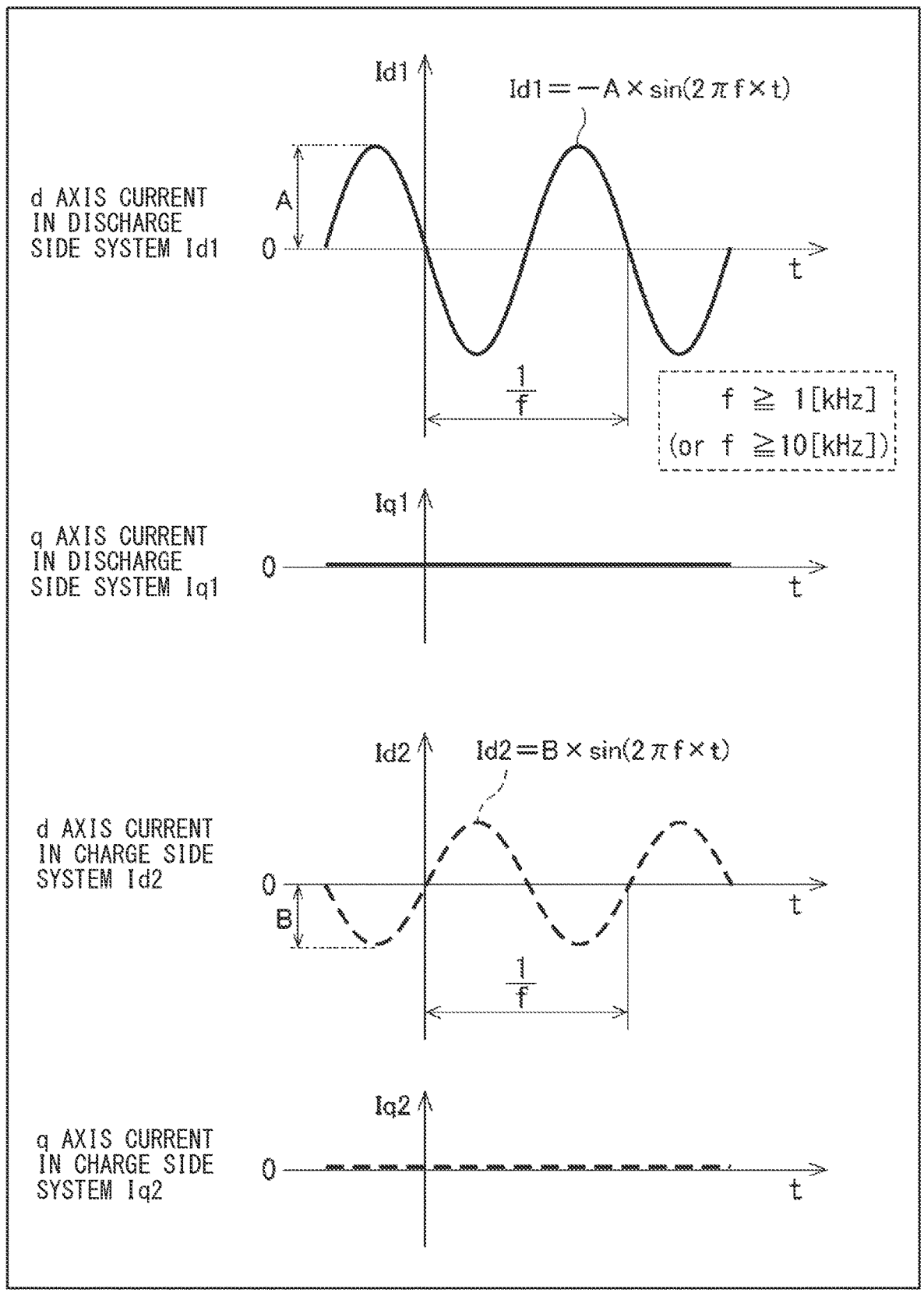
FIG. 13 is a current waveform diagram illustrating power transfer by high frequency energization.

With reference to FIG. 13, the technical method of power transfer by high frequency energization will be described. The voltage equation of the d-axis voltage of the double winding motor at the time of stop is represented by the equations (2.1s) and (2.3s) in which an equation of "ω=0" is set in the voltage equations (2.1) and (2.3) at the time of rotation described above. Further, the above equation (3.2) is used as a relational equation between the power supply of the charge side system and the electric power of the inverter. When an equation of "Iq2=0" is set in the equation (3.2), an equation of "Idc2×Vdc2=Id2×Vd2" is established.

$$Vd1 = (R + Ls)Id1 + Ms \times Id2 \tag{2.1s}$$

$$Vd2 = (R + Ls)Id2 + Ms \times Id1 \tag{2.3s}$$

$$Idc2 \times Vdc2 = Id2 \times Vd2 + Iq2 \times Vq2 \tag{3.2}$$

Here, according to the equations (6.1) and (6.2), the d-axis currents Id1 and Id2 of each system are defined as sine wave currents having the same frequency. The amplitude of (—A) of the d-axis current Id1 of the discharge side system and the amplitude B of the d-axis current Id2 of the charge side system are set to satisfy the equation of "A>0, B>0". In other words, the phase reference of "t=0" is set so that the equation of "A>0, B>0" is satisfied. Here, an equation of "A<0, B<0" may be defined, and t may be replaced with (t+nf). Generally, when a phase reference is not defined, the wave amplitude can be recognized as a positive value, but for convenience of explanation in the present specification, the amplitude is set to a positive or negative value according to the positive or negative value in the phase reference of "t=0". That is, the amplitude of the high-frequency current in the equation (6.1) is negative, the amplitude of the high-frequency current in the equation (6.2) is positive, and the amplitudes of both high-frequency currents have different signs.

(Equation 1)

$$Id1 = -A \times \sin(2\pi f \times t) \tag{6.1}$$

$$Id2 = B \times \sin(2\pi f \times t) \tag{6.2}$$

As shown in FIG. 13, the d-axis currents Id1 and Id2 of each system are reciprocal currents having opposite magnitude relations with respect to the center of amplitude at the same time point. Further, in this example, the q-axis currents Iq1 and Iq2 of each system are substantially 0. That is, the amplitude of the d-axis current component is a non-zero value, and the amplitude of the q-axis current component is approximately 0. Here, it may not be limited to this example, the absolute value of the amplitude of the d-axis current component may be larger than the absolute value of the amplitude of the q-axis current component.

The period of the sine wave is represented by (1/f), which is the reciprocal of the frequency f. In this specification, the frequency of 1 kHz or more corresponding to the responsiveness of the current control of the motor 80 is defined as "high frequency". Therefore, the frequency f of the high frequency currents Id1 and Id2 is set to 1 kHz or more. More preferably, the frequency f of the high frequency currents Id1 and Id2 is set to 10 kHz or more. The frequency range of 10 kHz or higher is substantially disposed on the high frequency side with respect to 20 Hz to 20 kHz, which is generally called the "audible range", except for a part range of 10 kHz to 20 kHz.

Using equations (6.1) and (6.2), "Id2×Vd2" is calculated by the following equation (7). In the last line, the double angle formula of trigonometric functions is used.

(Equation 2)

$$Id2 \times Vd2 = B \times \sin(2\pi f \times t) \quad (7)$$
$$\times \{(R+Ls) \times B \times \sin(2\pi f \times t) + Ms \times (-A \times \sin(2\pi f \times t))\} =$$
$$B \times \sin(2\pi f \times t)$$
$$\times \{RB \times \sin(2\pi f \times t) + 2\pi f LB \times \cos(2\pi f \times t) - 2\pi f MA \times \cos(2\pi f \times t)\} =$$
$$RB^2 \times \sin(2\pi f \times t)^2$$
$$+ 2\pi f LB^2 \times \cos(2\pi f \times t)\sin(2\pi f \times t) -$$
$$2\pi f MAB \times \cos(2\pi f \times t)\sin(2\pi f \times t) = B^2 \times \frac{R}{2}\{1 - \cos(4\pi f \times t)\} +$$
$$\pi f LB^2 \times \sin(4\pi f \times t) - \pi f MAB \times \sin(4\pi f \times t)$$

In the last line of equation (7), if the equation (8.1) is established, or under the condition that the equation of "B>0" is established, the equation of (8.2) which is prepared by dividing both sides of equation (8.1) by B is established, the equation of "Id2×Vd2<0" is satisfied.

(Equation 3)

$$B^2 \times \frac{R}{2}\{1 - \cos(4\pi f \times t)\} + \pi f LB^2 \times \sin(4\pi f \times t) < \quad (8.1)$$
$$\pi f MAB \times \sin(4\pi f \times t)$$

$$B \times \frac{R}{2}\{1 - \cos(4\pi f \times t)\} + \pi f LB \times \sin(4\pi f \times t) < \pi f MA \times \sin(4\pi f \times t) \quad (8.2)$$

At this time, the equation of "Idc2<0" is changed from the equation of "Idc2×Vdc2<0". That is, since the second DC current Idc2 becomes negative, it is possible to discharge from the first power supply Bt1 and charge the second power supply Bt2. In short, the values of A and B may be set so that the equations (8.1) and (8.2) are satisfied. The study has been performed using an equation that does not take wiring resistance into consideration, alternatively and specifically, the absolute value B of the amplitude may be set smaller than the absolute value A of the amplitude.

In this way, by setting the amplitude of the q-axis current component to approximately zero and energizing the d-axis currents Id1 and Id2 at high frequencies, electric power can be exchanged without generating torque or NV (e.g., noise, vibration). Although an example is shown when the d-axis currents Id1 and Id2 are energized at high frequencies, charging/discharging may be possible even when the q-axis currents Iq1 and Iq2 are energized at high frequencies. Since the frequency is high, the output shaft does not move, and torque fluctuations that hinder the steering of the driver, for example, do not occur. Further, by setting the frequency f to 10 kHz or more, which is higher than the audible range, the generation of sound audible to humans can be suppressed. And, as is obvious from Eq. (8.2), the influence of R is relatively smaller at high frequencies.

FIGS. 14A to 16C show examples of high frequencies in the charge operation during the stop. The horizontal axis of each drawing indicates the time t, and the vertical axis of "current/voltage" indicates the current or the voltage applied so that the current flows. In the following description, the notation of "current/voltage" means "current or voltage". The description of "flowing a current" is interpreted to include "applying a voltage so as to flow the current". Further, "high frequency" means "high frequency current" or "high frequency voltage".

Figure 14A:
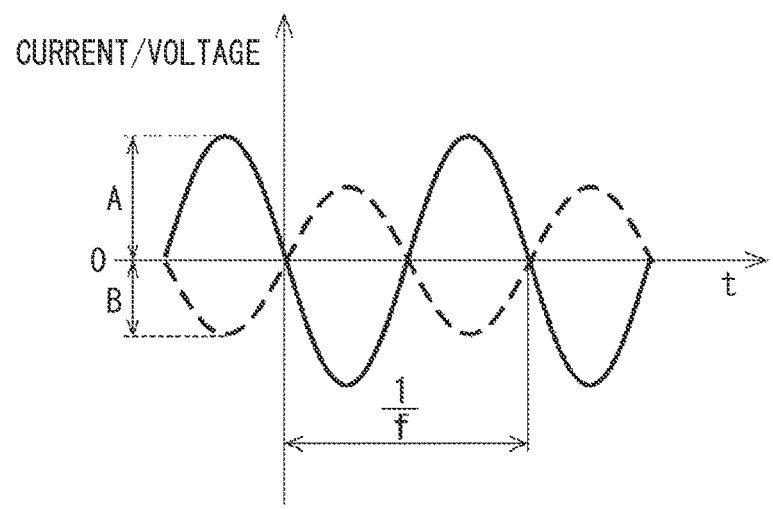
FIG. 14A is a waveform diagram showing an example of high frequency current/voltage.
Figure 14B:
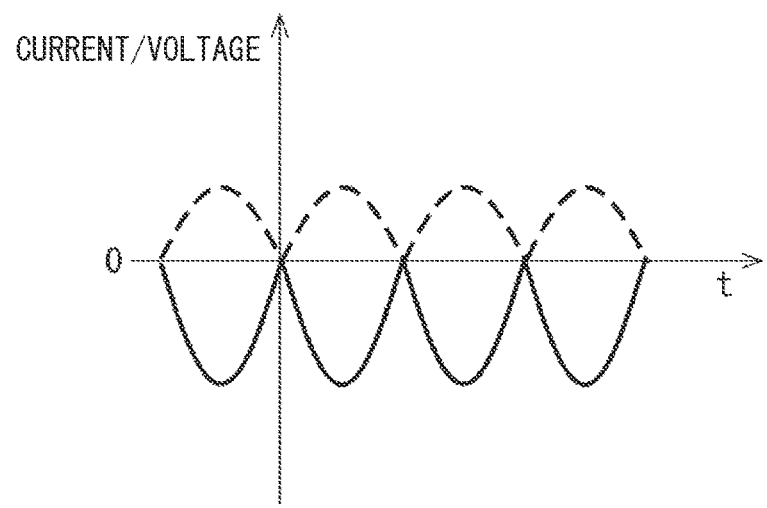
FIG. 14B is a waveform diagram showing an example of high frequency current/voltage.
Figure 15A:
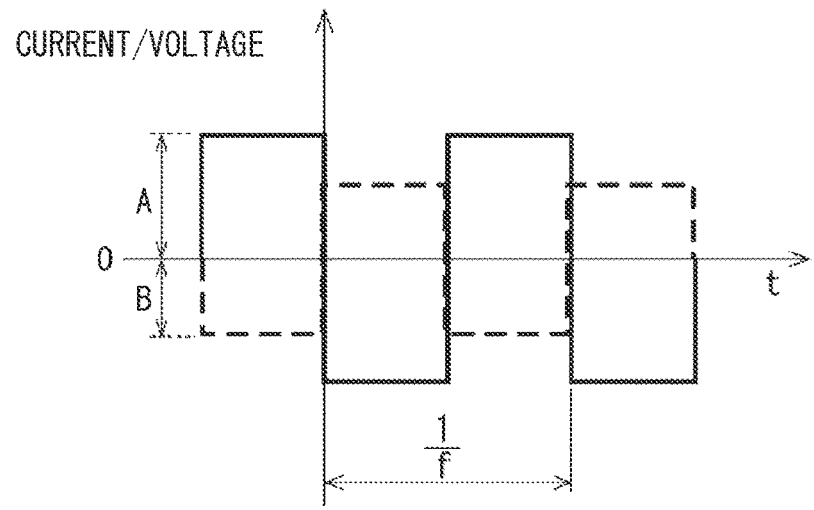
FIG. 15A is a waveform diagram showing an example of high frequency current/voltage.
Figure 15B:
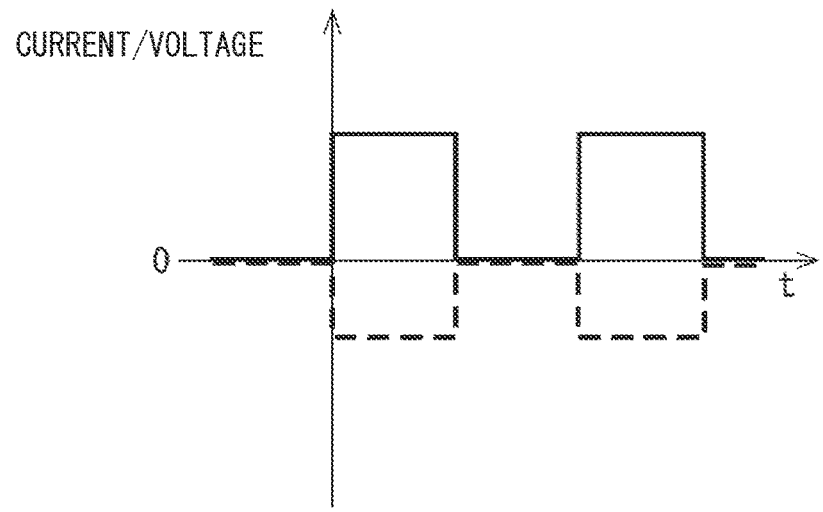
FIG. 15B is a waveform diagram showing an example of high frequency current/voltage.
Figure 15C:
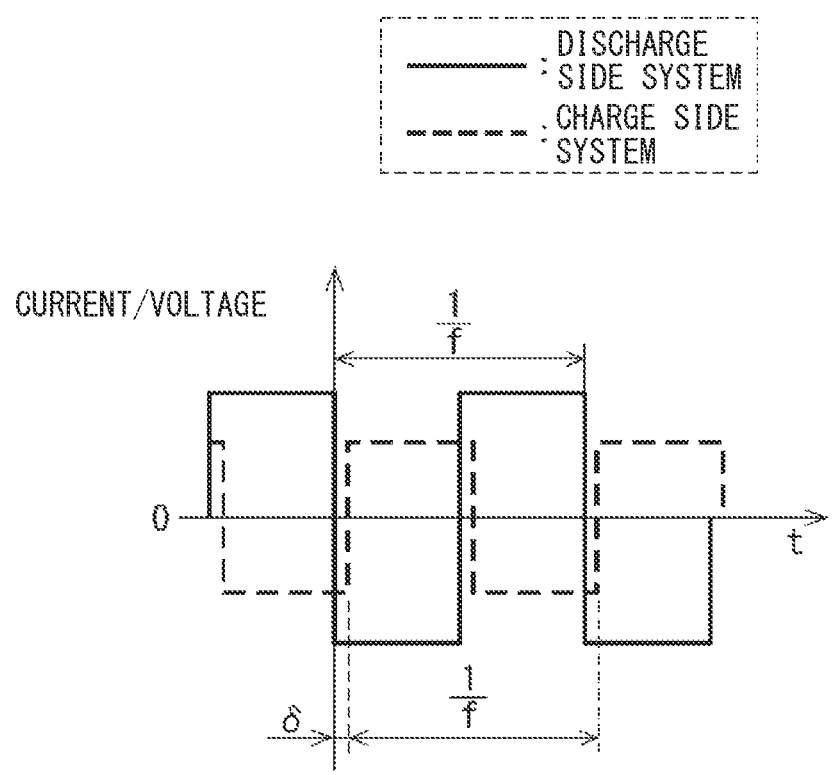
FIG. 15C is a waveform diagram showing an example of high frequency current/voltage.

As an example of the high frequency waveform, FIGS. 14A to 14C, and FIGS. 16A to 16C show a sine wave, and FIGS. 15A to 15C show a rectangular wave. Common to each example, the frequency f of the high frequencies of the discharge side system and the charge side system are the same, and the magnitude relations with respect to the amplitude center at the same time point are opposite to each other. The absolute value B of the amplitude of the high frequency waveform of the charge side system is smaller than the absolute value A of the amplitude of the high frequency waveform of the discharge side system. In addition, the phases when the amplitudes of the high-frequency waveforms of both systems are defined by different codes are basically the same. Here, as shown in FIGS. 14C and 15C, the phases of the high-frequency waveforms of both systems may be slightly different from each other.

FIGS. 14A to 15C show high-frequency waveforms of a sine wave and a rectangular wave in which an offset current corresponding to the assist current Ia* is passed. FIG. 14A shows a basic sine wave waveform according to FIG. 13. The amplitude center of the high frequency waveforms of the discharge side system and the charge side system is set to 0. FIG. 15A shows a rectangular wave waveform corresponding to FIG. 14A. In the rectangular wave waveform, the positive and negative of the current/voltage are instantly inverted every half cycle.

In the example shown in FIG. 14B, full-wave rectification is performed so as to leave only the negative side of the sine waveform of the discharge side system, and full-wave rectification is performed so as to leave only the positive side of the sine waveform of the charge side system. In the example shown in FIG. 15B, the rectangular wave waveforms of FIG. 15A are offset in opposite directions. The second power supply Bt2 is charged by energizing the current or applying a voltage so that the negative second direct current Idc2 flows through the charge side system.

FIGS. 14C and 15C show high-frequency waveforms in which the phases of both systems are slightly shifted (represented as "δ" in the drawing). As in this example, charging is possible even when there is an angle error between the two systems or an error in the calculation timing, or even when the phase is slightly shifted in a case where a voltage is applied due to variations in resistance or inductance. Here, if the phase shift becomes large, the charging efficiency decreases. Therefore, it is preferable to energize a high-frequency current/voltage so as to balance the charging efficiency and the difficulty of matching the phases with high accuracy. If the phase shift δ is relatively small, the waveform during the shift period can be negligible, and it is interpreted as "the magnitude relations at the same time point with respect to the amplitude center are opposite to each other" as a whole.

Figure 16A:
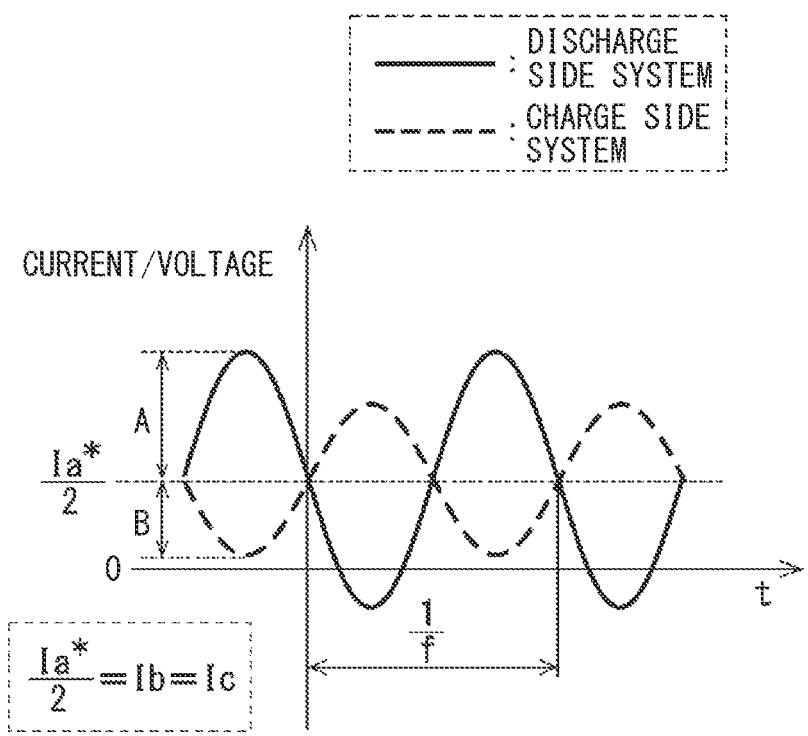
FIG. 16A is a waveform diagram showing an example of high frequency current/voltage.
Figure 16B:
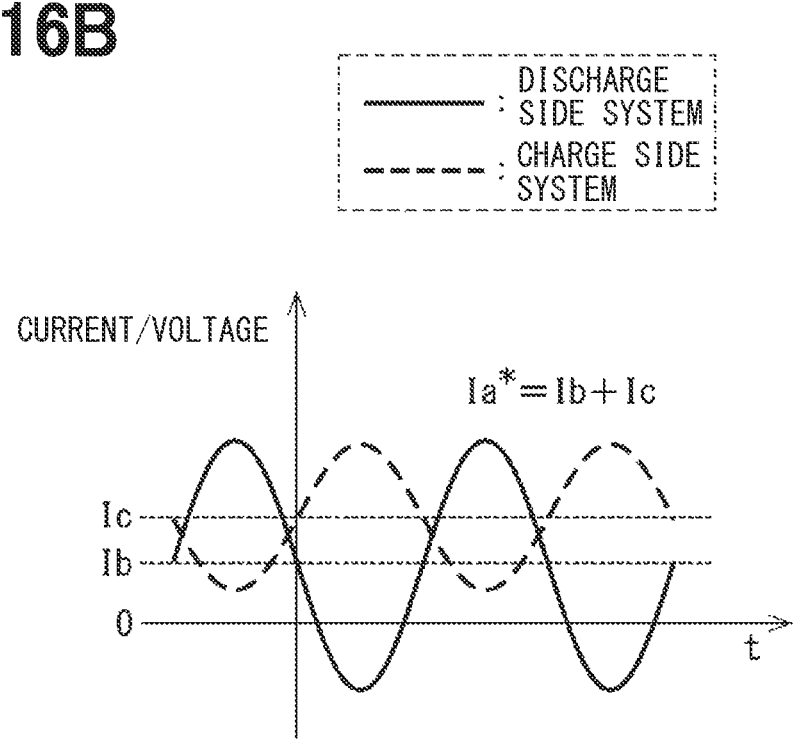
FIG. 16B is a waveform diagram showing an example of high frequency current/voltage.
Figure 16C:
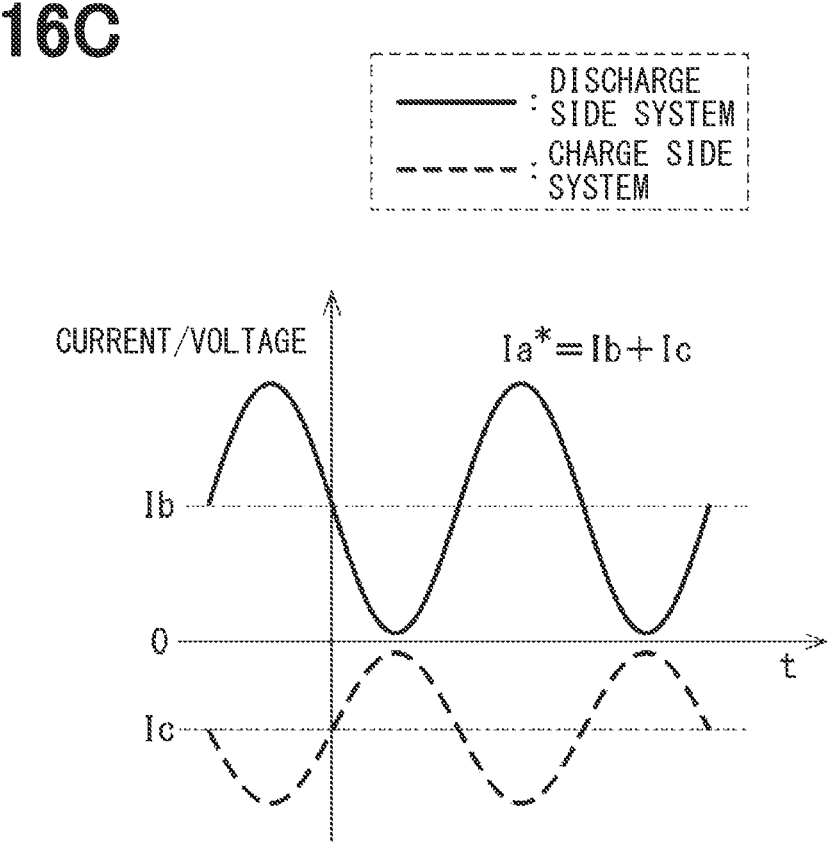
FIG. 16C is a waveform diagram showing an example of high frequency current/voltage.

In the example shown in FIGS. 16A to 16C, the control unit 40 changes the distribution of the assist current Ia* between the charge side system and the discharge side system according to the magnitude of the effective value of the high frequency. For example, a large assist current Ia* is passed in the discharge side system having a margin. When distributing the assist current Ia*, changing the positive and negative of the charge side system and the discharge side system by the distribution corresponds to performing both the charge operation during rotation and the charge operation during stop.

In the example shown in FIG. 16A, the amplitude centers of the high frequency waveforms of the discharge side system and the charge side system are both set to a half of the assist current (Ia*/2). From the correspondence with the following two cases, it is expressed as "(Ia*/2)=Ib=Ic (>0)". That is, the assist current Ia* is equally divided between the charge side system and the discharge side system.

The example shown in FIG. 16B assumes a case where the power difference between the discharge side system and the charge side system is relatively small. The amplitude center of the high frequency waveform of the discharge side system is set to Ib (>0), and the amplitude center of the high frequency waveform of the charge side system is set to Ic (>Ib). Ib and Ic have a relationship of "Ia*=Ib+Ic (>0)" with respect to the assist current Ia*. That is, the assist current Ia is distributed to Ib and Ic in the charge side system and the discharge side system.

The example shown in FIG. 16C assumes a case where the power difference between the discharge side system and the charge side system is relatively large. The amplitude center of the high frequency waveform of the discharge side system is set to Ib (>0), and the amplitude center of the high frequency waveform of the charge side system is set to Ic (<0). Ib and Ic have a relationship of "Ia*=Ib+Ic(>0)" with respect to the assist current Ia*. That is, the assist current Ia is distributed to Ib and Ic in the charge side system and the discharge side system.

In each example of FIGS. 16A to 16C, the amplitude center Ic of the high frequency waveform of the charge side system corresponds to the average torque of the charge side system, and the amplitude center Ib of the high frequency waveform of the discharge side system corresponds to the average torque of the discharge side system. Further, the assist current Ia* corresponds to the rotation direction of the motor 80 or the torque command to the motor 80. Therefore, the sum of the average torque of the charge side system and the average torque of the discharge side system has the same sign as the rotation direction of the motor 80 or the torque command to the motor 80.

Effects of First Embodiment (1) The control unit 40 energizes the charge side system and the discharge side system with reciprocal currents having opposite actions on the three-phase winding sets 801 and 802, and performs the charge operation from the discharge side power supply via the double winding motor 80 to the charge side power supply. By utilizing the magnetic coupling of the double winding motor 80, it is possible to transfer power between the two power supplies Bt1 and Bt2.

(2) When the need for charging occurs in either of the two power supplies Bt1 and Bt2, the control unit 40 switches the charge operation according to the operating state of the motor 80, specifically according to whether the motor 80 is rotating or stopped. Thereby, a more appropriate charging operation can be selected from the viewpoint of torque and heat generation according to the magnitude of the assist current Ia*.

(3) In the charge operation during rotation, the control unit 40 energizes the charge side system so as to generate torque in the direction opposite to the rotation direction of the motor 80, and energizes the discharge side system so as to generate torque to supplement the reverse torque. As a result, it is possible to transfer power between the two power supplies Bt1 and Bt2 by utilizing the magnetic flux of the magnet of the double winding motor 80 while suppressing the generation of heat during rotation in which the assist current Ia* is relatively large.

(4) When performing the operation during the stop, the control unit 40 energizes a high-frequency current of 1 kHz or higher, which has the same frequency and opposite magnitude relations with respect to the center of amplitude at the same time point, or applies the high frequency voltage so as to flow the high frequency current. As a result, power can be transferred and received between the two power supplies Bt1 and Bt2 by utilizing the mutual inductance during the stop in which the assist current Ia* is 0 or a relatively small value.

(5) The absolute value B of the amplitude of the high frequency current of the charge side system in the stopped operation is smaller than the absolute value A of the amplitude of the high frequency current of the discharge side system. As a result, the charge operation from the discharge side system to the charge side system can be appropriately performed. Further, since the frequency of the high frequency current is higher than 10 kHz, the generation of sound audible to humans is almost suppressed.

Second Embodiment

In the dual power supply motor drive system 201 of the first embodiment shown in FIG. 4, the two power supplies Bt1 and Bt2 are arranged independently. On the other hand, variations relating to the connection configuration of the two power supplies Bt1 and Bt2 will be described as the motor drive system of the second and third embodiments.

Figure 17:
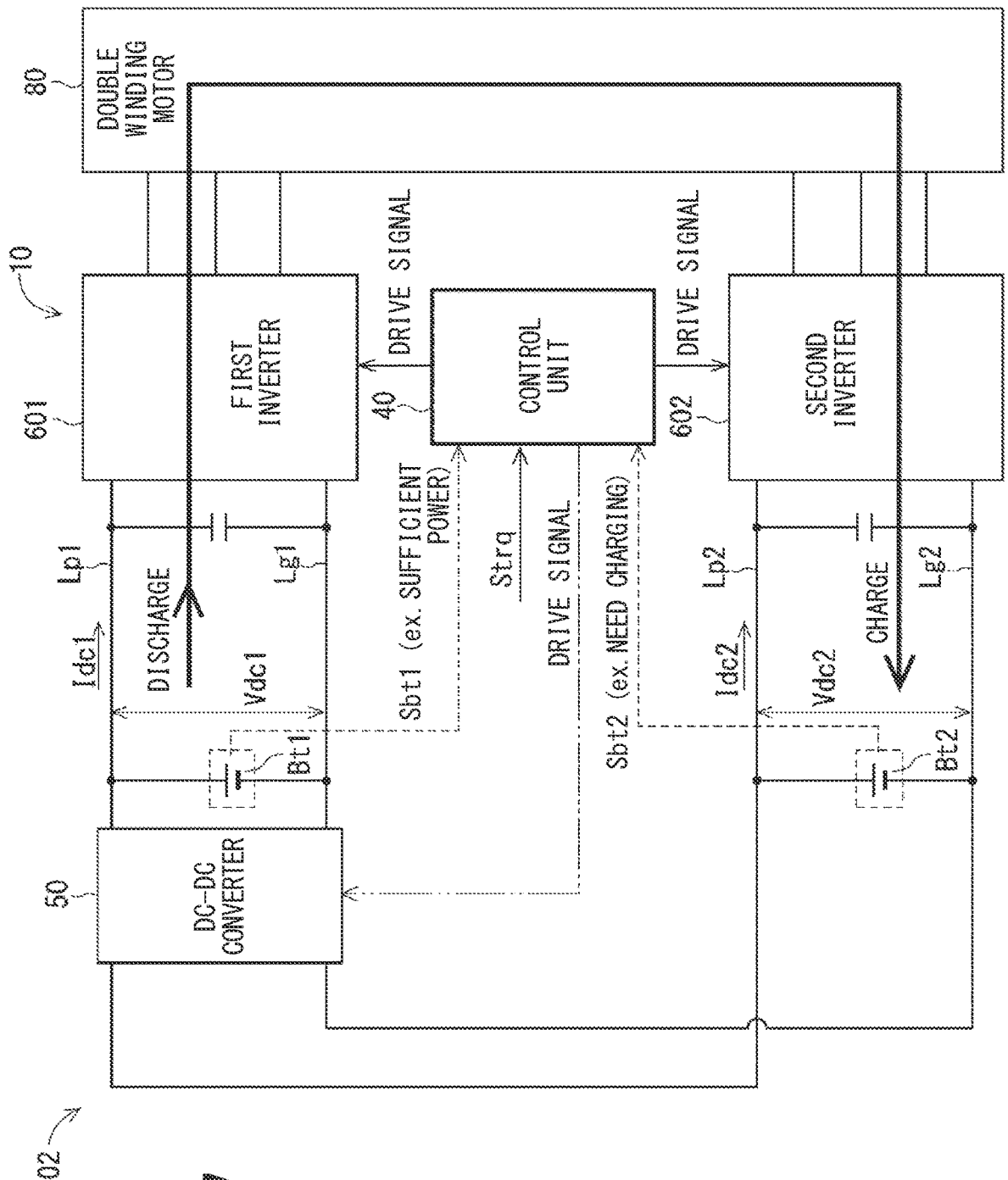
FIG. 17 is a schematic diagram of a dual power supply motor drive system according to a second embodiment.

As shown in FIG. 17, the dual power supply motor drive system 202 of the second embodiment includes a DC-DC converter 50 capable of converting DC power between the first power supply Bt1 and the second power supply Bt2. In other words, the ECU 10 is applied to a system in which two power supplies Bt1 and Bt2 are connected via a DC-DC converter 50. The DC-DC converter 50 may be an insulated type or a non-insulated type. Based on the drive signal from the control unit 40, the DC-DC converter 50 steps up and down the power supply voltage of one system as necessary and outputs the voltage to the other power supply.

In the second embodiment, in addition to the operation using the magnetic coupling of the double winding motor 80 as in the first embodiment, power can be exchanged between the two power supplies Bt1 and Bt2 via the DC-DC converter 50, and a dual system relating to the power supply charge is configured. That is, even if one of the charge systems fails, charging can be realized by using the other charge system. Comparison with the second embodiment, the motor drive system 201 of the first embodiment, which does not include the DC-DC converter 50, realizes cost reduction by reducing the number of parts.

Third Embodiment

Figure 18:
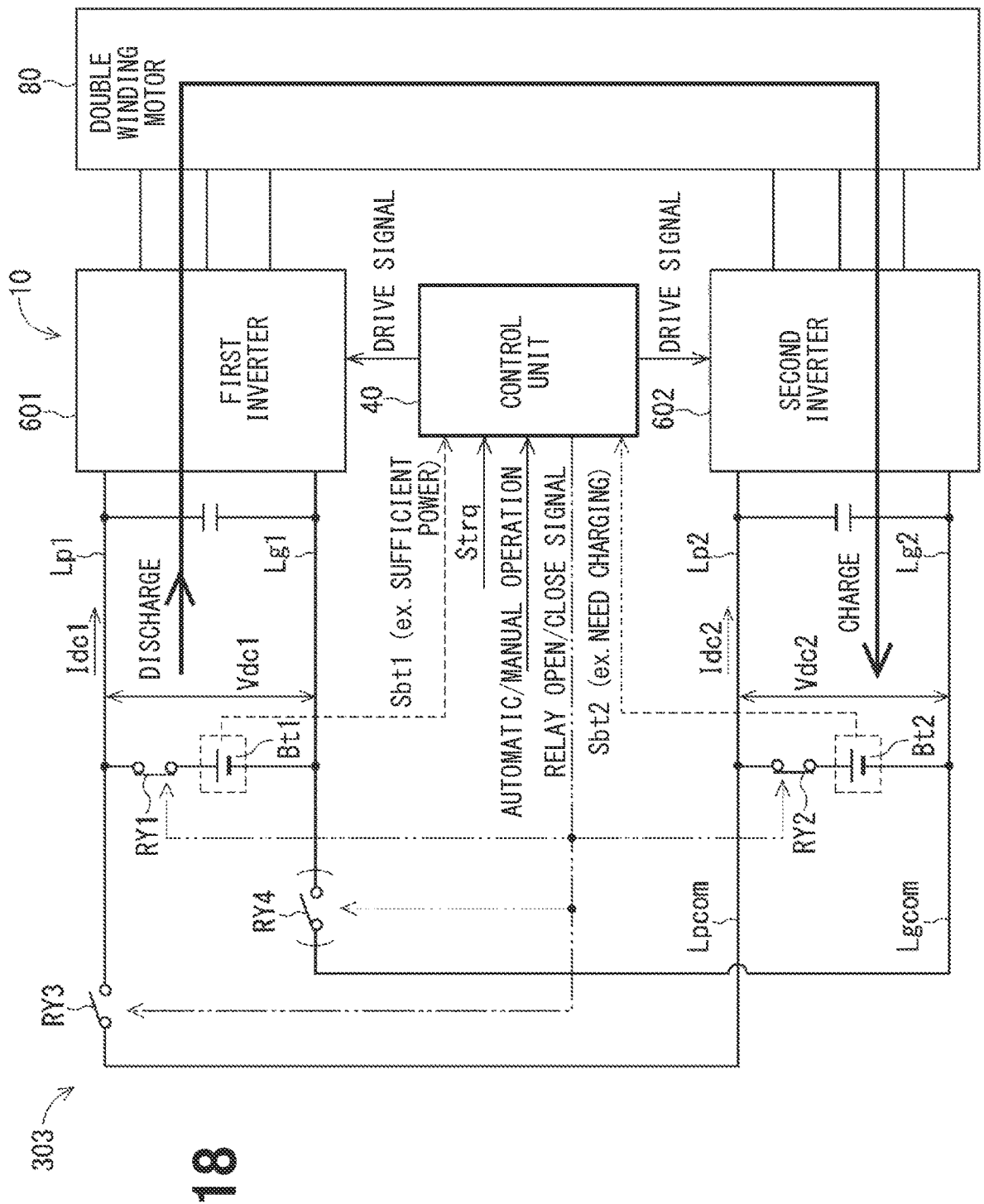
FIG. 18 is a schematic diagram of a dual power supply motor drive system according to a third embodiment.
Figure 19:
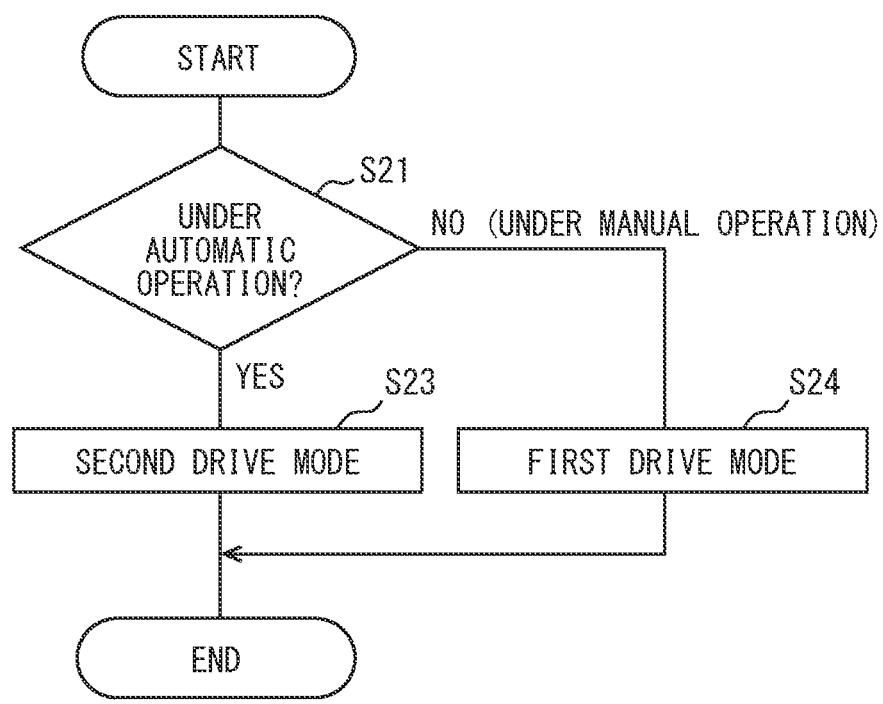
FIG. 19 is a drive mode switching flowchart according to the third embodiment.

The third embodiment will be described with reference to FIG. 18 to FIG. 19. As shown in FIG. 18, in the dual power supply motor drive system 203 of the third embodiment, the inverters 601 and 602 of each system are individually connected to the two power supplies Bt1 and Bt2 in some drive modes, and are connected to the common power supply in another drive mode other than that.

The high-potential lines Lp1 and Lp2 of each system are connected by a common high-potential line Lpcom, and the low-potential lines Lg1 and Lg2 of each system are connected by a common low-potential line Lgcom. Between the common high potential line Lpcom and the common low potential line Lgcom, the first relay RY1 for power supply switching is connected in series with the first power supply Bt1, and the second relay RY2 for power supply switching is connected in series with the second power supply Bt2. A third relay RY3 for power supply switching is provided in the middle of the common high potential line Lpcom, and a fourth relay RY4 for power supply switching is provided in the middle of the common low potential line Lgcom. The fourth relay RY4 for power supply switching may not be provided, and the common low potential line Lgcom may be always connected. In the configuration of FIG. 18, the alternator is connected to the first power supply Bt1 and charges the second power supply Bt2 by a DC-DC converter (not shown) or by the operation using the magnetic coupling of the double winding motor 80.

The dual power supply motor drive system 203 of the third embodiment is mounted on a vehicle capable of switching between automatic operation and manual operation. The control unit 40 receives a signal indicating whether the traveling state of the vehicle is automatic driving or manual driving, and switches between the "first drive mode" and the "second drive mode" according to the traveling state of the vehicle. For details, as shown in the flowchart of FIG. 19, it is determined in S21 whether or not automatic operation is in progress. During the automatic operation, it is determined as "YES" in S21, and the control unit 40 sets to the "second drive mode" at S23. During the manual operation, it is determined as "NO" in S21, and the control unit 40 sets the "first drive mode" in S24.

In the "first drive mode", two systems of inverters 601 and 602 are connected to a common power supply. When the common power source is the first power source Bt1, the control unit 40 turns on the first relay RY1, the third relay RY3, and the fourth relay RY4 for power supply switching, and turns off the second relay RY2. When the common power source is the second power source Bt2, the control unit 40 turns on the second relay RY2 for power supply switching, the third relay RY3, and the fourth relay RY4, and turns off the first relay RY1.

For example, as shown in FIGS. 5A and 5B, when the first power source Bt1 is a battery having a capacity or power larger than that of the second power source Bt2, the common power source is basically fixed to the first power source Bt1. On the other hand, when two batteries having the same capacity and power are used, it may be selected which one is used as a common power source based on the remaining capacity of each power source at that time.

In the "second drive mode", two systems of inverters 601 and 602 are connected to separate power supplies Bt1 and Bt2. The control unit 40 turns on the first relay RY1 and the second relay RY2 for power switching, and turns off the third relay RY3 and the fourth relay RY4. FIG. 18 shows this state. In the configuration in which the fourth relay RY4 is not provided, the control unit 40 turns off only the third relay RY3.

In particular, when there is a difference in capacity and power between the two power supplies Bt1 and Bt2, the "first mode" is set during manual operation using the first power source Bt1 with a large capacity and power, so that it is possible to reduce the load on the second power supply Bt2 having a small capacity and power. Further, during the automatic operation, by using the two separate power supplies Bt1 and Bt2 in the "second mode", the power supply becomes a redundant configuration and the reliability is improved.

Figure 20:
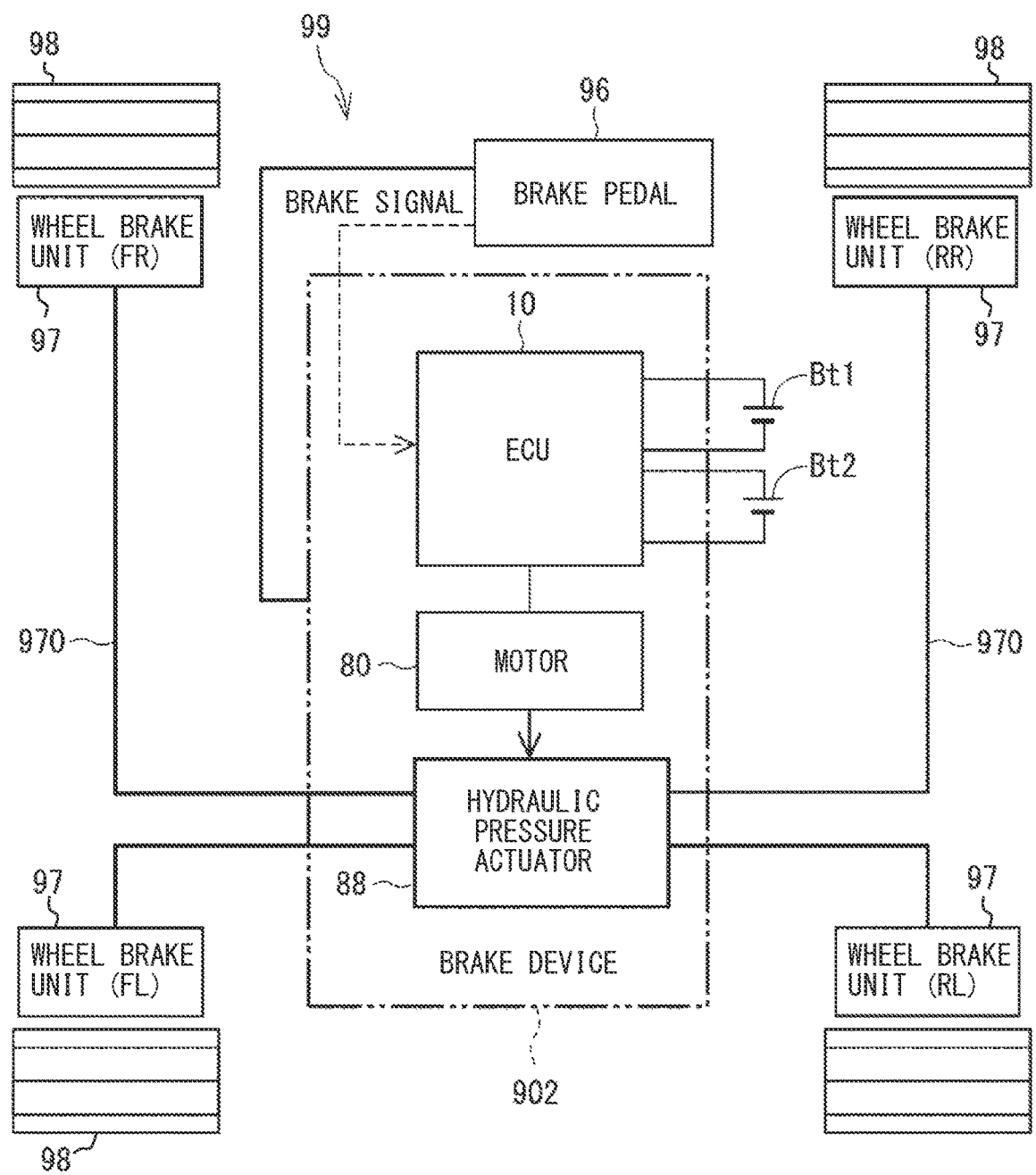
FIG. 20 is a schematic configuration diagram of a brake device to which a control device (i.e., ECU) for a multi-phase rotating machine according to another embodiment is applied.

OTHER EMBODIMENTS (A) As the charge operation switching process according to the operating state of the motor 80, the process shown in the flowchart of FIG. 6 may be changed as follows.
[1] Not limited to the two categories of rotation and stop, there may be a rotation speed band in which the systems are not charged.
[2] During steering, the assist may be prioritized and the charge operation during rotation may not be performed, but only the charge operation during stop may be performed.
[3] Prioritizing the charging efficiency, the charge operation may be performed only when the rotation speed is larger than the threshold value.
[4] In order to increase the amount of charge, both the charge operation during rotation and the charge operation during the stop may be performed during rotation.
(B) In the charge operation during rotation of the above embodiment, the control unit 40 energizes so that the torque in the direction opposite to the rotation direction of the motor 80 is generated in the charge side system, and the torque to compensate the torque in the opposite direction in the discharge side system, so that the charging operation is performed while ensuring the output of the assist torque. Here, when the charge operation is prioritized over the assist function, even if the torque that completely compensates for the reverse torque is not generated in the discharge side system, at least the current that is opposite to the current applied to the charge side system is energized.
(C) In the third embodiment, the drive mode is switched depending on whether it is in automatic operation or manual operation. In other embodiments, the drive mode may be switched depending on the traveling state of the vehicle other than that or another condition.
(D) The phase difference between the two winding sets 801 and 802 in the double winding motor 80 may not be limited to the electric angle 30 [degrees], and may be arranged in the same phase, for example. Moreover, the number of phases of the motor may not be limited to three phase and may be four phases or more.
(E) As an example of another device to which the control device for the multi-phase rotating machine according to the present disclosure is applied, FIG. 20 shows a vehicle brake device 902. In the four-wheeled vehicle 99, each wheel 98 is provided with a wheel brake unit 97. In the drawing, (FR), (FL), (RR), and (RL) mean the wheel brake units 97 of the right front wheel, the left front wheel, the right rear wheel, and the left rear wheel, respectively. A hydraulic pressure actuator 88 such as a hydraulic oil pump supplies hydraulic pressure to each wheel brake unit 97 via a hydraulic pressure pipe 970. In each wheel brake unit 97, the brake pad is pressed against the brake disc by the supplied hydraulic pressure to lock the wheel 98.

The brake device 902 includes an ECU 10, a motor 80, and a hydraulic pressure actuator 88. The ECU 10 connected to the two power supplies Bt1 and Bt2 rotates the double winding motor 80 based on the brake signal from the brake pedal 96, and drives the hydraulic pressure actuator 88 with the output torque of the double winding motor 80. When one of the two power supplies Bt1 and Bt2 needs to be charged in the brake device 902 having such a configuration, the control unit of the ECU 10 enables power transfer between two power sources Bt1 and Bt2, similar to the above embodiment applied to the steering device 901.

(F) The control device for the multi-phase rotating machine of the present disclosure may not be limited to the steering device and the brake device exemplified in FIGS. 1 and 20, alternatively, it may be applied to the double winding motor of the system other than the vehicle and the double winding motor having other purposes mounted on the vehicle. The present disclosure is applicable to systems in which power transfer between the two power sources may be required in a configuration in which the power is supplied from the two power sources to the double winding motor.

The present disclosure should not be limited to the embodiment described above. Various other embodiments may be implemented without departing from the scope of the present disclosure.

In the above embodiment, each of the control unit may be provided separately as one or more than one controller or may be provided integrally as one or more than one controller. Such a controller and method thereof described in the present disclosure may be implemented by one or more than one special-purpose computer. Alternatively, the control circuit described in the present disclosure and the method thereof may be realized by a dedicated computer configured as a processor with one or more dedicated hardware logic circuits. Alternatively, the control unit and the technique according to the present disclosure may be achieved using one or more dedicated computers constituted by a combination of the processor and the memory programmed to execute one or more functions and the processor with one or more hardware logic circuits. Further, the computer program may be stored, as a program product, in a computer-readable non-transitory tangible storage medium as instructions to be executed by a computer.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for controlling a drive of a double winding type multi-phase rotating machine that has two multi-phase winding sets of two systems magnetically coupled to each other, and outputs a torque, generated by energizing the multi-phase winding set of each system and added to each other, to a common output shaft, the control device comprising:
two electric power converters in the two systems that are individually connected to two power supplies in at least a part of drive modes, convert a direct current electric power input from the power supplies into an alternating current electric power, respectively, and supply the alternating current electric power to the multi-phase winding sets; and
a control unit that controls an operation of the electric power converters and controls an energization to the multi-phase winding sets, wherein:
one of the two power supplies that needs to be charged is defined as a charge side power supply; the other of the power supplies that is an other side of the charge side power supply is defined as a discharge side power supply;
the control unit energizes a charge side system connected to the charge side power supply and a discharge side system connected to the discharge side power supply with reciprocal currents having an opposite action on the multi-phase winding sets; and
the control unit executes a charge operation from the discharge side power supply to the charge side power supply via the multi-phase rotating machine.

2. The control device for the multi-phase rotating machine according to claim 1, wherein:
when the control unit executes the charge operation, the control unit energizes the charge side system so as to generate a torque in a direction opposite to a rotation direction of the multi-phase rotating machine.

3. The control device for the multi-phase rotating machine according to claim 2, wherein:
when the control unit executes the charge operation, the control unit energizes the charge side system so as to generate the torque in the direction opposite to the rotation direction of the multi-phase rotating machine, and energizes the discharge side system so as to generate a torque compensating for the torque in the direction opposite to the rotation direction.

4. The control device for the multi-phase rotating machine according to claim 3, wherein:
when the control unit executes the charge operation, the control unit energizes the charge side system with a q-axis current in the direction opposite to the rotation direction of the multi-phase rotating machine, and energizes the discharge side system with the q-axis current so as to compensate for the q-axis current in the direction opposite to the rotation direction.

5. The control device for the multi-phase rotating machine according to claim 3, wherein:
when the control unit executes the charge operation, the control unit switches, according to an operation state of the multi-phase rotating machine, between:
an operation for energizing the charge side system so as to generate the torque in the direction opposite to the rotation direction of the multi-phase rotating machine, and energizing the discharge side system so as to generate a torque compensating for the torque in the direction opposite to the rotation direction; and an operation for energizing with high frequency currents having a frequency equal to or higher than 1 kHz, which has a same frequency and an opposite magnitude relation with respect to a center of an amplitude, or applying high frequency voltages so as to flow the high frequency currents.

6. The control device for the multi-phase rotating machine according to claim 1, wherein:
when the control unit executes the charge operation, the control unit (i) energizes and sets high frequency currents to a frequency equal to or higher than 1 kHz, the high frequency currents having a same frequency and an opposite magnitude relation with respect to a center of an amplitude, or (ii) applies high frequency voltages so as to flow the high frequency currents.

7. The control device for the multi-phase rotating machine according to claim 5, wherein:
an absolute value of an amplitude of one of the high frequency currents of the charge side system is smaller than an absolute value of an amplitude of the other of the high frequency currents of the discharge side system.

8. The control device for the multi-phase rotating machine according to claim 6, wherein:
when the control unit energizes the high frequency currents or applies the high frequency voltages so as to flow the high frequency currents, a sum of an average torque of the charge side system and an average torque of the discharge side system has a same sign as a rotation direction of the multi-phase rotating machine or a torque command to the multi-phase rotating machine.

9. The control device for the multi-phase rotating machine according to claim 6, wherein:
the high frequency currents have an absolute value of an amplitude of a d-axis current component larger than an absolute value of an amplitude of a q-axis current component.

10. The control device for the multi-phase rotating machine according to claim 6, wherein:
the frequency of the high frequency currents is higher than 10 KHz.

11. The control device for the multi-phase rotating machine according to claim 1, wherein:
the control unit energizes the charge side system so as to generate the torque in a direction opposite to a rotation direction of the multi-phase rotating machine, and energizes the discharge side system so as to generate a torque compensating for the torque in the direction opposite to the rotation direction when the multi-phase rotating machine is rotating; and
the control unit energizes with high frequency currents having a frequency equal to or higher than 1 kHz, which has a same frequency and an opposite magnitude relation with respect to a center of an amplitude, or applies high frequency voltages so as to flow the high frequency currents when the multi-phase rotating machine is stopped or in a low rotation state in which the multi-phase rotating machine is rotating at a rotation speed equal to or lower than a predetermined rotation speed.

12. The control device for the multi-phase rotating machine according to claim 1, wherein:
the multi-phase rotating machine is applied to a vehicle steering device.

13. The control device for the multi-phase rotating machine according to claim 1, wherein:
the multi-phase rotating machine is applied to a vehicle brake device.

14. The control device for the multi-phase rotating machine according to claim 1, wherein:
the two power supplies have different capacities for storing electricity.

15. The control device for the multi-phase rotating machine according to claim 1, wherein:
the two power supplies have different capacities for outputting electricity.

16. The control device for the multi-phase rotating machine according to claim 1, wherein:
the multi-phase rotating machine is applied to a system including a DC-DC converter capable of converting a direct current electric power between the two power supplies.

17. The control device for the multi-phase rotating machine according to claim 1, wherein:
the control device for the multi-phase rotating machine is mounted on a vehicle; and
the control unit switches, according to a traveling state of the vehicle, between:
a first drive mode in which the two electric power converters of the two systems are connected to a common power supply among the two power supplies; and
a second drive mode in which the two electric power converters of the two systems are connected to individual power supplies among the two power supplies, respectively.

18. The control device for the multi-phase rotating machine according to claim 17, wherein:
the multi-phase rotating machine is mounted on the vehicle that is capable of switching between an automatic driving and a manual driving; and
the control unit sets to the second drive mode during the automatic driving and sets to the first drive mode during the manual driving.

19. The control device for the multi-phase rotating machine according to claim 1, wherein:
each of the two power supplies comprise a battery.

* * * * *